US009520703B2

(12) United States Patent
Jaena et al.

(10) Patent No.: US 9,520,703 B2
(45) Date of Patent: Dec. 13, 2016

(54) ELECTRICAL BUSWAY SPLICE CONNECTOR

(71) Applicant: Power Distribution, Inc., Richmond, VA (US)

(72) Inventors: Mario L. Jaena, Kent, WA (US); Vladimir Gulkarov, San Diego, CA (US)

(73) Assignee: Power Distribution, Inc., Richmond, VA (US)

( * ) Notice: Subject to any disclaimer, the term of this patent is extended or adjusted under 35 U.S.C. 154(b) by 0 days.

(21) Appl. No.: 15/018,753

(22) Filed: Feb. 8, 2016

(65) Prior Publication Data

US 2016/0156169 A1 Jun. 2, 2016

Related U.S. Application Data

(63) Continuation-in-part of application No. 14/928,795, filed on Oct. 30, 2015, which is a continuation of application No. 14/448,043, filed on Jul. 31, 2014, now Pat. No. 9,190,791.

(60) Provisional application No. 62/199,162, filed on Jul. 30, 2015.

(51) Int. Cl.
*H02G 5/08* (2006.01)
*H01R 25/14* (2006.01)
*H01R 25/16* (2006.01)
*H01R 13/187* (2006.01)

(52) U.S. Cl.
CPC .............. *H02G 5/08* (2013.01); *H01R 25/145* (2013.01); *H01R 25/162* (2013.01); *H01R 13/187* (2013.01)

(58) Field of Classification Search
CPC ... H01R 25/162; H01R 25/145; H01R 13/187; H01R 24/68; H01R 24/86; H01R 9/2675; H02G 5/08
USPC ................ 439/213, 110, 719, 507, 509, 210, 113,439/207, 209; 174/72 B, 88 B, 88 R, 149 B
See application file for complete search history.

(56) References Cited

U.S. PATENT DOCUMENTS

| | | | |
|---|---|---|---|
| 3,181,102 A | 4/1965 | Fehr, Jr. | |
| 3,189,679 A | 6/1965 | Scofield | |
| 3,475,567 A | 10/1969 | Hollander | |
| 3,710,301 A * | 1/1973 | Weimer | .................. H02G 5/08 174/99 B |
| 4,179,174 A | 12/1979 | Jorgensen | |
| 4,462,657 A | 7/1984 | Snowdon | |
| 4,493,516 A * | 1/1985 | Attema | .................. H01R 25/14 439/111 |

(Continued)

FOREIGN PATENT DOCUMENTS

JP        2001/266972        9/2001

*Primary Examiner* — Abdullah Riyami
*Assistant Examiner* — Harshad Patel
(74) *Attorney, Agent, or Firm* — Snell & Wilmer LLP

(57) ABSTRACT

A busway splice connector can include a first connector and a second connector. Each of the first connector and the second connector can define a busbar volume for receiving a portion of two busbars. The busway splice connector can also include a first housing that defines a first compartment for receiving the first connector. The busway splice connector can also include a second housing that defines a second compartment for receiving the second connector. The busway splice connector can also include an insulator configured to be positioned between the first housing and the second housing and to insulate the first connector from the second connector when the busway splice connector is assembled.

19 Claims, 19 Drawing Sheets

(56) References Cited

U.S. PATENT DOCUMENTS

| | | | |
|---|---|---|---|
| 4,886,940 A * | 12/1989 | Gagnon | H02G 5/007 |
| | | | 174/16.2 |
| 5,336,097 A | 8/1994 | Williamson, Jr. et al. | |
| 5,449,056 A | 9/1995 | Ross | |
| 5,588,884 A | 12/1996 | Rudoy | |
| 5,609,254 A | 3/1997 | Loftus et al. | |
| 5,655,922 A * | 8/1997 | Dux | H05K 7/1478 |
| | | | 439/213 |
| 5,760,339 A | 6/1998 | Faulkner et al. | |
| 5,854,445 A | 12/1998 | Graham et al. | |
| 6,039,584 A | 3/2000 | Ross | |
| 6,105,741 A | 8/2000 | Ross | |
| 6,176,711 B1 * | 1/2001 | Rohr | H01R 25/145 |
| | | | 174/98 |
| 6,296,498 B1 | 10/2001 | Ross | |
| 6,517,363 B2 * | 2/2003 | Ross | H01R 25/145 |
| | | | 439/115 |
| 6,521,837 B2 | 2/2003 | Hilgert et al. | |
| 6,803,523 B2 | 10/2004 | Yuasa | |
| 6,805,226 B1 | 10/2004 | Ross et al. | |
| 6,870,103 B1 | 3/2005 | Wiant et al. | |
| 6,983,742 B2 | 1/2006 | Jordan et al. | |
| 7,014,516 B2 | 3/2006 | Yang | |
| 7,134,903 B1 | 11/2006 | Pavlovic | |
| 7,374,444 B1 | 5/2008 | Bennett | |
| 7,468,488 B1 | 12/2008 | Hilgert | |
| 7,470,861 B1 | 12/2008 | Ross et al. | |
| 7,678,995 B2 | 3/2010 | Hengel | |
| 7,819,676 B1 | 10/2010 | Cardoso et al. | |
| 7,980,872 B1 | 7/2011 | Smutny et al. | |
| 2005/0277336 A1 * | 12/2005 | Yang | H01R 13/187 |
| | | | 439/636 |
| 2008/0302553 A1 | 12/2008 | Ross et al. | |
| 2010/0029129 A1 | 2/2010 | Cox et al. | |
| 2010/0203757 A1 * | 8/2010 | Mostoller | F21V 19/0055 |
| | | | 439/510 |
| 2011/0261508 A1 * | 10/2011 | Ross | H01R 25/14 |
| | | | 361/624 |
| 2012/0094512 A1 * | 4/2012 | Northey | G09B 19/00 |
| | | | 439/116 |
| 2012/0264317 A1 * | 10/2012 | Balcerak | H01R 13/514 |
| | | | 439/212 |
| 2013/0052850 A1 | 2/2013 | Osterhart et al. | |
| 2013/0171849 A1 | 7/2013 | Mooney et al. | |

* cited by examiner

ELECTRICAL BUSWAY SPLICE CONNECTOR

CROSS REFERENCE TO RELATED APPLICATIONS

This application is a continuation-in-part (CIP) of U.S. patent application Ser. No. 14/928,795 entitled Electrical Busway Splice Connector, filed on Oct. 30, 2015, which is a continuation of U.S. patent application Ser. No. 14/448,043 entitled Electrical Busway Splice Connector, filed on Jul. 31, 2014, now U.S. Pat. No. 9,190,791. This application also claims the benefit and priority of U.S. Provisional Application No. 62/199,162, entitled Improved Electrical Busway Splice Connector, filed on Jul. 30, 2015. The entire contents of these applications are hereby incorporated by reference in their entirety herein.

BACKGROUND

1. Field of the Invention

The invention relates to a splice connector for joining or connecting sections of an electrical busway and for being used as an end feed coupler for busways.

2. Description of the Related Art

Busways are used in many environments to provide power from a power source to electrical equipment. Some busways available in the marketplace include multiple straight, angled and/or branching busway sections that can be connected together using busway splice connectors. The busway sections can be connected together is various configurations to create a customized busway for any particular environment.

Each of the busway sections can include one or more busbars in parallel with each other and a casing surrounding the one or more busbars. For example, a busway section can include four parallel busbars enclosed within a casing. The busway splice connectors typically include one or more electrical connectors, each for connecting a pair of busbars of adjoining busway sections. Many busway sections may be used in any given busway. Thus, it is desirable for assembly of each of the busway splice connectors to be relatively quick and easy.

A power-receiving end of each busway is typically mechanically affixed to a structure, such as a wall or ceiling, and is positioned near a power source for receiving power. Traditionally, the power-receiving end of the busway is connected to the power source using a connector called an end feed coupler. Thus, in order to create a conventional busway using multiple busway sections, busway sections, busway splice connectors and at least one end feed coupler may be necessary.

Occasionally, situations may occur during which a busbar or a busbar section of a busway requires replacement. It is typically desirable for a busbar or a busbar section to be easily and quickly replaceable to reduce potentially costly downtime of connected equipment.

Thus, there is a need in the art for a busway splice connector that is relatively inexpensive, is relatively quick and easy to assemble and that allows for easy replacement of busbars.

SUMMARY OF THE INVENTION

A busway splice connector according to various embodiments can include a first connector and a second connector. Each of the first connector and the second connector can define a busbar volume for receiving a portion of two busbars. The busway splice connector can also include a first housing that defines a first compartment for receiving the first connector. The busway splice connector can also include a second housing that defines a second compartment for receiving the second connector. The busway splice connector can also include an insulator configured to be positioned between the first housing and the second housing and to insulate the first connector from the second connector when the busway splice connector is assembled.

Another busway coupler section can be designed to be usable as part of a busway splice connector or as part of a busway end feed coupler. The busway coupler section can include a connector defining a busbar volume for receiving a portion of at least one busbar of a busbar section. The busway coupler section can also include a housing defining a window and a compartment for receiving the connector. The busway coupler section can also include a cover configured to be coupled to the housing. The cover can restrict access to the window when coupled to the housing. In that regard, the busway coupler is usable as part of a busway splice connector when the cover is coupled to the housing and usable as part of an end feed coupler when the cover is not coupled to the housing.

Another busway splice connector can also be used as a busway splice connector or an end feed coupler and can include a first connector and a second connector each defining a busbar volume for receiving a portion of two busbars. The busway splice connector can also include a first housing defining a first window and a first compartment for receiving the first connector. The busway splice connector can also include a second housing defining a second window and a second compartment for receiving the second connector. The busway splice connector can include a first cover configured to be coupled to the first housing to restrict access to the first window and a second cover configured to be coupled to the second housing to restrict access to the second window. In that regard, the busway splice connector can be used as a busway splice connector when the first cover and the second cover are coupled to the first housing and the second housing and can be used as an end feed coupler without inclusion of the first cover and the second cover.

BRIEF DESCRIPTION OF THE DRAWINGS

FIG. 1 is an exploded view illustrating components of a busway including a busway splice connector and two busway sections according to an embodiment of the present invention;

DETAILED DESCRIPTION OF THE PREFERRED EMBODIMENTS

Figure 3:
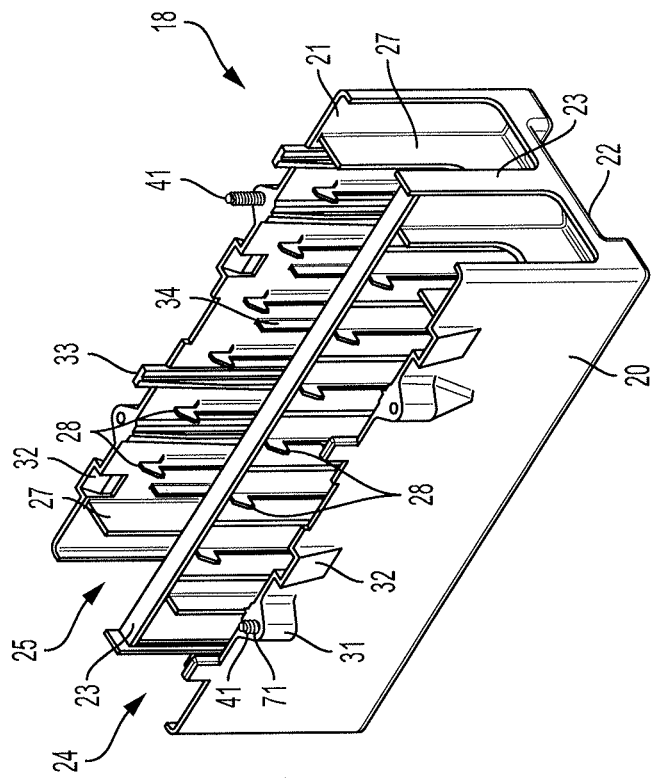
FIG. 3 is a drawing of a housing section for housing the pair of connectors of FIG. 2 according to an embodiment of the present invention.

Apparatus, systems, and/or methods that implement the embodiments of the various features of the present disclosure will now be described with reference to the figures. The figures and the associated descriptions are provided to illustrate some embodiments of the present disclosure and are not meant to be limiting. Throughout the drawings, reference numbers are re-used to indicate correspondence between referenced elements. A connection, when mentioned in this document, may refer to any communication channel between modules, and the communications may occur via a wired connection, a wireless connection, or a combination of the two and may refer to a one-way connection or two-way connection.

The phrases "upper," "lower," "bottom," "top," along with any other directional references, are used throughout the disclosure to show one relative positioning of the components of the busways. However, one skilled in the art will realize that a busway according to the present disclosure may include components oriented in any manner such that "top" components may be positioned at a bottom, on a side or the like. Furthermore, specific fasteners are disclosed herein. However, one skilled in the art will realize that different types of fasteners can be used without departing from the scope of the present disclosure.

Referring to FIG. 1, components of a busway splice connector 70 for coupling a first busway section 1 to a second busway section 2 are shown. The busway section 1 includes a pair of lower busbars 3 including a busbar 3A and a busbar 3B (hidden from view) and a pair of upper busbars 4 including a busbar 4A and a busbar 4B. The busway section 2 also includes a pair of lower busbars 5 including a busbar 5A and a busbar 5B (hidden from view) and a pair of upper busbars 6 including a busbar 6A and a busbar 6B. The busbars 3, 4, 5, 6 may be electrically conductive and thus transfer electricity. In some embodiments, a busway section can include any number of busbars.

The busway section 1 may also include a housing 11 and a bracket 7 for supporting the busbars 3, 4, and the busway section 2 may include a housing 12 and a bracket 7 for supporting the busbars 5, 6. Either or both busway sections 1, 2 may include additional components (not shown) for receiving power taps and for electrically coupling the power taps to the busbars 3, 4, 5, 6.

Each of the busway sections 1, 2 may include grooved side panels 8 to facilitate heat dispersion, a top panel 9 and an outer side panel 10. The grooved side panels 8, the top panel 9 and the outer side panel 10 may include metal. One or more of these features may be integral with the housings 11, 12 and/or mounted thereto and may provide electromagnetic shielding around the busbars 3, 4, 5, 6.

As shown in FIG. 1, the busbars 3, 4, 5, 6 in the respective busway sections 1, 2 are axially aligned so that ends 13 of the busbars 3, 4, 5, 6 face each other. For example, the busbars 3, 5 may have a longitudinal axis such that an end 13A of the busbar 3A is axially aligned with, and facing, an axial end 13B of the busbar 5A. In some embodiments, the ends 13A, 13B may or may not contact each other. Although the busway sections 1, 2 and busbars 3, 4, 5, 6 are shown as being straight, busway sections and/or busbars may be angled, curved or the like.

Electrical connection between the busbars 3, 4, 5, 6 is provided by connectors 14, 15, 16, 17, which may each be electrically conductive, have a generally U-shaped cross-section and define a busbar volume for receiving ends of two busbars. For example, the connector 14 can define a busbar volume 51 and the connector 15 can define a busbar volume 52.

The connector 14 may electrically connect the busbar 3A of the first busway section 1 and the busbar 5A of the second busway section 2. In order to do so, the busbar volume 51 of the connector 14 may receive the end 13A of the busbar 3A and the end 13B of the busbar 5A such that the ends 13A, 13B are in contact with the connector 14. Contact between the connector 14 and the respective ends 13A, 13B allows current to flow between the busbar 3A and the busbar 5A. In some embodiments, the connector 14 can have a cross-section having a different shape than a U-shape, such as a square or rectangle. In that regard, the connector 14 may still be elongated such that the busbar volume 51 is still large enough to receive the ends 13A, 13B of the busbars 3A, 5A. Each of the other connectors 15, 16, 17 may operate in a similar manner.

Two of the connectors 14, 15 are housed within a lower housing 18 and two of the connectors 16, 17 are housed in an upper housing 19.

Figure 2:
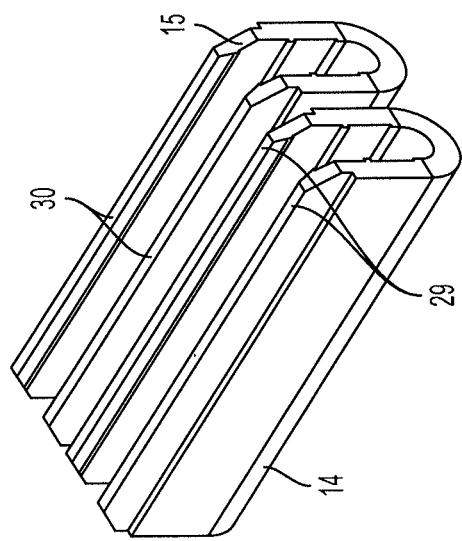
FIG. 2 is a drawing of a pair of connectors for connecting ends of two busbars of the busway splice connector of FIG. 1 according to an embodiment of the present invention.

Referring now to FIGS. 2 and 3, the lower housing 18 may include an insulating material, such as a plastic, that resists deformation due to relatively high temperatures and other physical stressors. The lower housing 18 may receive and provide support for the corresponding connectors 14, 15. The lower housing 18 may electrically isolate the connector 14 from the connector 15 and may isolate the connectors 14, 15 from components external to the lower housing. The upper housing 19 may have similar features as the lower housing 18.

The lower housing 18 may include two sidewalls 20, 21 and a bottom wall 22 that may be integral with and perpendicular to the sidewalls 20, 21. Together, the sidewalls 20, 21 and the bottom wall 22 may form three sides of a structure having a cross-section resembling, for example, a rectangular, square, triangular or the like. An isolating wall 23 may extend through a volume defined by the structure and may be substantially parallel to one or both sidewalls 20, 21. The isolating wall 23 may extend in a direction perpendicular to the bottom wall 22 and between the sidewalls 20, 21. The isolating wall 23 separates the lower housing 18 into two compartments 24, 25. Each of the compartments 24, 25 is designed to receive one of the connectors 14, 15.

A first connector bulkhead 26 is positioned at one end of the compartment 25 and a second connector bulkhead 27 is positioned at another end of the compartment 25. Each connector bulkhead may have a cut-out that matches the shape of an outer surface of the connectors 14, 15, such as a U-shape, and into which the connectors 14, 15 are fitted. In that regard, the cut-out may provide support for the connectors 14, 15 when received by the compartments 24, 25. The connectors 14, 15 may be further supported and held in place by detents or hooks 28 at least partially extending into each of the compartments 24, 25. Stated differently, the hooks 28 may extend from each of the sidewalls 20, 21 towards the isolating wall 23 and from both sides of the isolating wall 23 towards each of the sidewalls 20, 21. A distance between the inward-most ends of the detents or hooks 28 within each of the compartments 24, 25 may be slightly less than a width of the connectors 14, 15. Thus, the hooks 28 may enable the connectors 14, 15 to be coupled to the lower housing 18 via a snap fit connection.

More particularly, the connectors 14, 15 may be inserted into one of the compartments 24, 25 of the lower housing 18 by pushing them past the hooks 28. This force may cause the hooks 28 and/or the sidewalls 20, 21 to flex sufficiently to permit passage of the connectors 14, 15 past the hooks 28 and into the compartments 24, 25. When the connectors 14, 15 are fully inserted into the housing sections and the outer surface of the connectors 14, 15 are seated in the corresponding U-shaped cut-outs of the bulkheads 26, 27, the hooks 28 and/or sidewalls 20, 21 may return to their unflexed state and extend over the top edges 29, 30 of the connectors 14, 15. When in this position, the hooks 28 resist separation of the connectors 14, 15 from the lower housing 18. Optional vertically-extended ribs 34 extending inward from the sidewalls 20, 21 and/or isolating wall 23 may also be provided to further support and align the connectors 14, 15 within the respective compartments 24, 25.

The lower housing 18 may also include exterior fastening structures or flanges 31 that extend outward from the sidewalls 20, 21. The flanges 31 may be designed to receive fasteners for securing the lower housing 18 to the upper housing 19 of FIG. 1. The lower housing 18 may also include alignment structures such as pillars 33 arranged to extend into alignment slots of the upper housing 19 of FIG. 1. The lower housing may also or instead include alignment slots 32 arranged to receive pillars of the upper housing 19 of FIG. 1. The pillars 33 and alignment slots 32 may facilitate alignment of the lower housing 18 and the upper housing 19 of FIG. 1.

Figure 5:
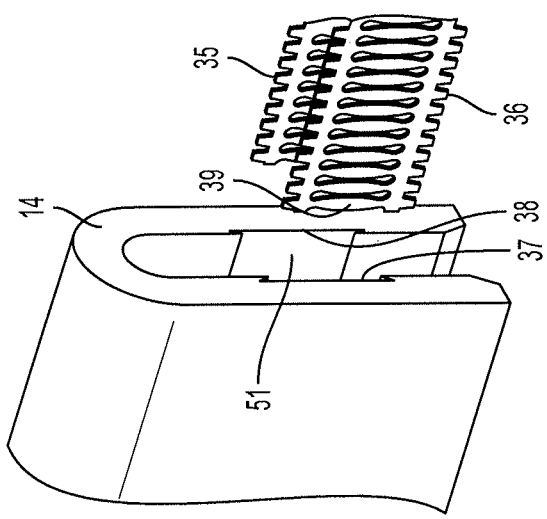
FIG. 5 is an enlarged view of the connector and louvers of FIG. 4 according to an embodiment of the present invention.
Figure 4:
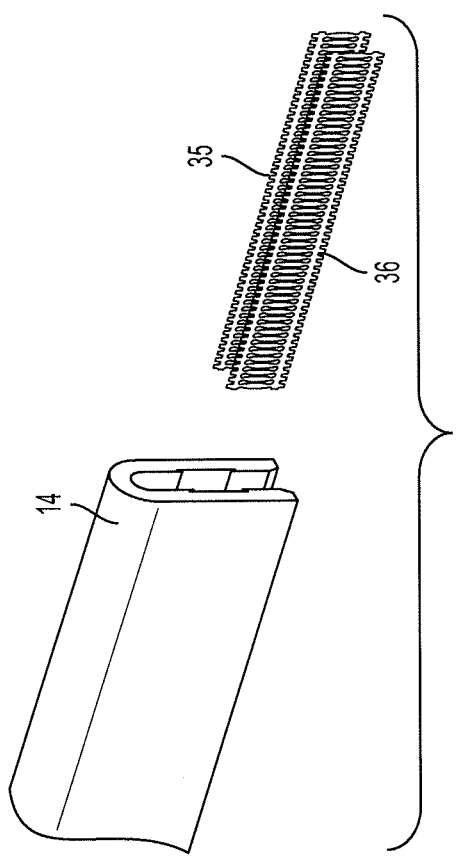
FIG. 4 is a drawing of one of the connectors of FIG. 2 along with a pair of multi-contact louvers to be inserted into the connector according to an embodiment of the present invention.

Referring now to FIGS. 4 and 5, the connector 14 is designed to receive one or more set of multi-contact slotted louvers 35, 36. The louvers 35, 36 may be coupled to inward-facing surfaces of the connector 14. The connector 14 may include dovetail grooves 37, 38 for receiving the louvers 35, 36. A height of the dovetail groove 38 may be less than a height of the louvers 35 such that when the louvers 35 are received by the dovetail groove 38, the louvers 35 resist separation from the connector 14 and bow inward towards the busbar volume 51 (i.e., towards the dovetail groove 37) due to the height difference.

Because the louvers 35, 36 bow inward into the busbar volume 51, the opposing force created by insertion of the busbar may result in greater surface area contact between the louvers 35, 36 and the busbar than a conventional press-fit configuration. Stated differently, the louvers 35, 36 may exert a force on a received busbar to increase the quality of the electrical connection between the connector 14 and the corresponding busbars.

The slots in the louvers 35 enable each individual louver 39 to conform to the exterior surfaces of the corresponding busbars, thus accommodating dimensional and positional tolerances of individual busbars. The louvers 35 may be coupled to the connector 14 in any other manner, may be replaced by other contacts, such as plain sheet metal, and/or may not exist such that inner surfaces of the electrically conductive contact directly contact busbars without departing from the scope of the disclosure.

Returning to FIG. 1, after the connectors 14, 15, 16, 17 have been assembled to the respective lower housing 18 and upper housing 19, the busbars 3, 4, 5, 6 are inserted into the corresponding connectors 14, 15, 16, 17. In that regard, ends of each facing pair of busbars 3, 4, 5, 6 are received by and electrically connected together by the connectors 14, 15, 16, 17. For example, the busbar 3A and the busbar 5A may be aligned such that the end 13A of the busbar 3A may face and be proximate to the end 13B of the busbar 5A. When aligned in this manner, the connector 14 may be placed over the ends 13A, 13B and forced into place over both of the ends 13A, 13B. The louvers 35, 36 may bow inward and contact the busbars 3A, 5A near the ends 13A, 13B, thus establishing electrical connection between the busbars 3A and 5A.

In additional to the vertical isolation provided by isolating wall 23 of the lower housing 18, a planar insulator 40 may be provided for horizontal isolation between the lower connectors 14, 15 and the upper connectors 16, 16. Thus, inclusion of the isolating wall 23 and the planar insulator 40 may result in each of the connectors 14, 15, 16, 17 being electrically insulated. The upper housing 19 and the lower housing 18 may define a volume when coupled together into which the planar insulator 40 may be positioned. While the insulator 40 is described as planar, one skilled in the art will realize that an insulator used between the upper housing 19 and the lower housing 18 can have any other shape.

The dimensions of the planar insulator 40 may be sufficiently large to enable the planar insulator 40 to isolate each of the upper connectors 16, 17 from each of the lower connectors 14, 15. In some embodiments and referring to FIGS. 1 and 3, the dimensions of the planar insulator 40 may be less than the dimensions of the mating interface between the lower housing 18 and the upper housing 19. In that regard, the planar insulator 40 may fit entirely within the volume defined by the lower housing 18 and the upper housing 19. Stated differently, the planar dimensions of the planar insulator 40 may be less than the dimensions of a plane defined by the sidewalls 20, 21 such that the sidewalls 20, 21 of the lower housing 18 and the upper housing 19 can contact each other. To accommodate the planar insulator 40 within the lower housing 18, the height of the isolating wall 23 may be less than that of the sidewalls 20, 21 by an amount approximately equal to half the thickness of the planar insulator 40. This allows the entire planar insulator 40 to be positioned within the assembled housing when the lower housing 18 is coupled to the upper housing 19.

In order to assemble the busway splice connector 70, the lower housing 18 and the upper housing 19 may be secured together about the busbars 3, 4, 5, 6 by appropriate fasteners, such as fasteners 41. The fasteners 41 may extend through threaded through-holes 71 in vertically aligned flanges 31 of the lower housing 18 and the upper housing 19. In some embodiments, the fasteners may include threading, latches, snap-fit arrangements, or other fastening means.

Returning reference to FIG. 1, after the lower housing 18 and the upper housing 19 have been assembled about the busbars 3, 4, 5, 6, ends of a ground strap 42 may be fastened to respective top panels 9 of the busway sections 1, 2. This fastening may occur, for example, by fitting openings 43 in the ends of the ground strap 42 over threaded posts 44 extending from the respective top panels 9 and securing the ground strap 42 using appropriate fasteners, such as nuts. It is desirable for the ground strap 42 to be sufficiently fastened to the busway sections 1, 2 to resist separation of the upper housing 19 from the busbars 3, 4, 5, 6 during a high current event, such as a power surge. Thus, the threaded posts 44 and nuts, or any other fastening means, may be designed to resist such separation.

As illustrated, the ground strap 42 includes a raised bridge section 45 that extends over the splice. This allows heat to dissipate from the connectors 16, 17 via vent holes 72 of the upper housing 19. The ground strap 42 may still restrain movement of the upper housing 19 relative to the busbars 3, 4, 5, 6 due to a tapered section 74 of the ground strap 42 interfacing with a tapered section 73 of the upper housing 19.

In some embodiments, the ground strap 42 may be surrounded by a heat-shrink insulator sleeve (not shown). An insulating top cover 46 may be installed over the upper housing 19 and the ground strap 42 and secured by fasteners 47 to cover the ground strap 42 for improving the look of the busway 75.

A lower cover 48 may be installed over the lower housing 18 and secured by fasteners 49. The lower cover 48 may cover and/or provide support for one or more data or communications cables (not shown) that may run along tracks or passages provided at the side or bottom of the busway 75. A shield housing 50 may be positioned over and coupled to at least one of the lower housing 18 or the lower cover 48. The shield housing 50 may be coupled to the busway 75 in any manner sufficient to resist separation of the lower housing 18 from the busbars 3, 4, 5, 6 during high current events.

Figure 6:
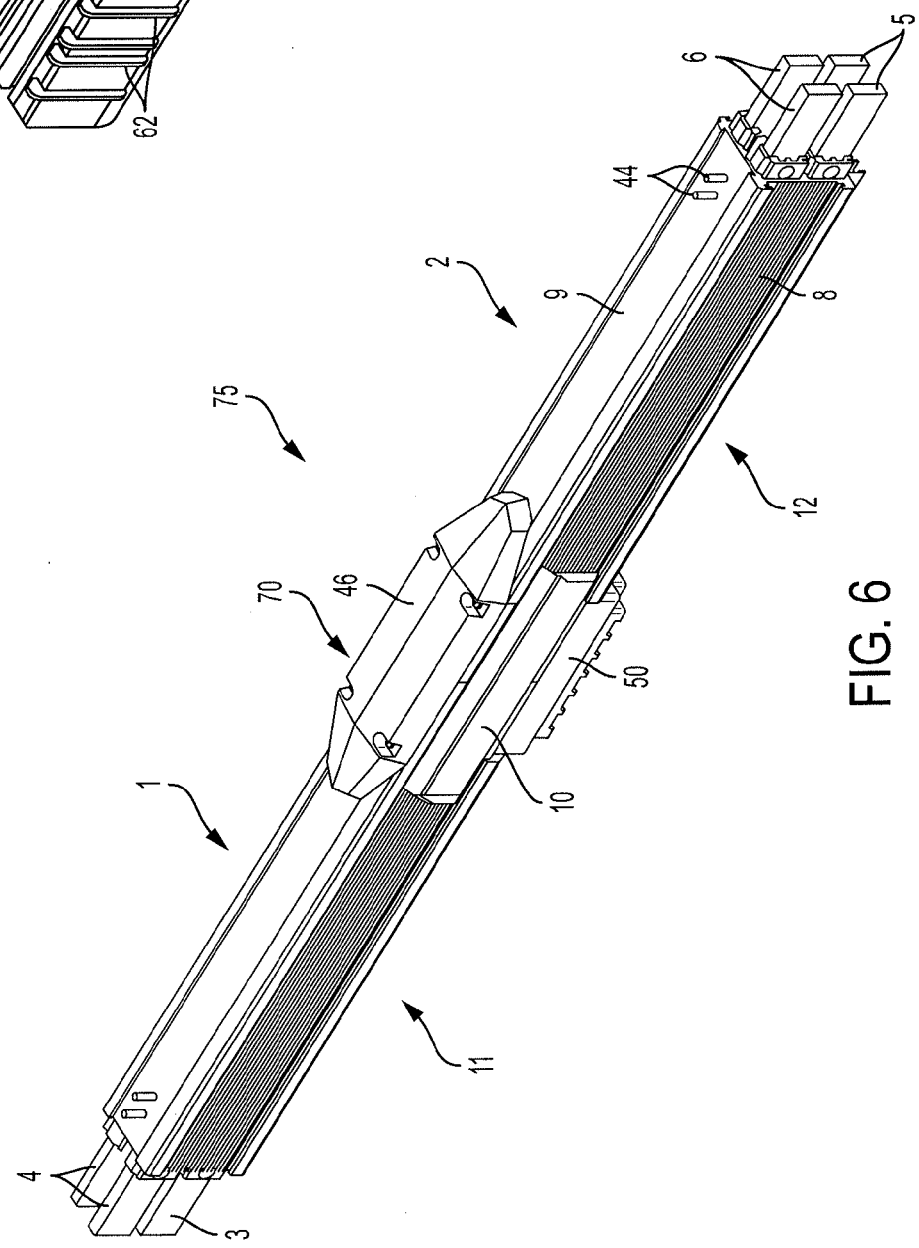
FIG. 6 is drawing of the busway splice connector of FIG. 1 as assembled according to an embodiment of the present invention.

Referring now to FIGS. 1 and 6, the busway splice connector 70 is shown fully assembled about first busway section 1 and the second busway section 2. The side panel 10 may be slidably coupled to the first busway section 1 such that it can slide over and cover a side of the busway splice connector 70. Further, the insulating top cover 46 extends outward from the top panel 9 of the busway sections 1, 2. This provides space for the heat to be dissipated via the vent holes 72. Similarly, the shield housing 50 extends away from a lower panel (not shown) of the busway sections 1, 2 to allow for ventilation from the lower cover 48.

Figure 7:
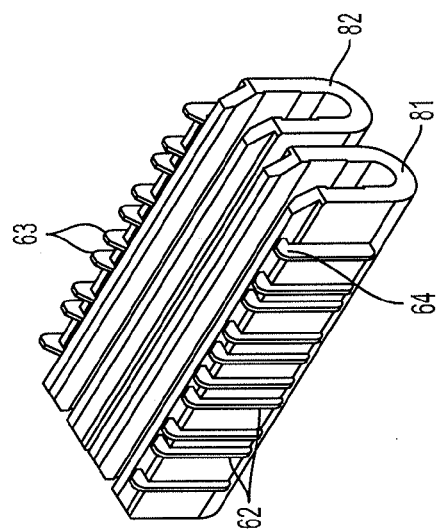
FIG. 7 is a drawing of connectors having smaller dimensions than the connectors of FIG. 2 along with spacers such that the connectors and spacers can fit within a volume of a housing designed for the connectors of FIG. 2 according to an embodiment of the present invention.

Referring now to FIGS. 3 and 7, spacers 62, 63 may be provided along with connectors 81, 82 that are similar to and smaller in size than the connectors 14, 15. The spacers 62, 63 may allow the connectors 81, 82 to be coupled to the lower housing 18. For example, the combined spacers 62, 63 and connectors 81, 82 may be coupled within the lower housing 18 via an interference fit or press fit connection.

The connectors 81, 82 may have the smaller dimensions in order to mate with busbars having smaller dimensions than the busbars 3, 4, 5, 6 of FIG. 1. The spacers 62, 63 may be designed to fit over at least part of the outer surface of the connectors 81, 82. The spacers 62, 63 may or may not include a feature to resist separation from the connectors 81, 82, such as hooks or detents 64 that extend over a portion of the connectors 81, 82. If the spacers 62, 63 do not include such a feature, the spacers 62, 63 may be held in place due to the interference or press fit.

Figure 8:
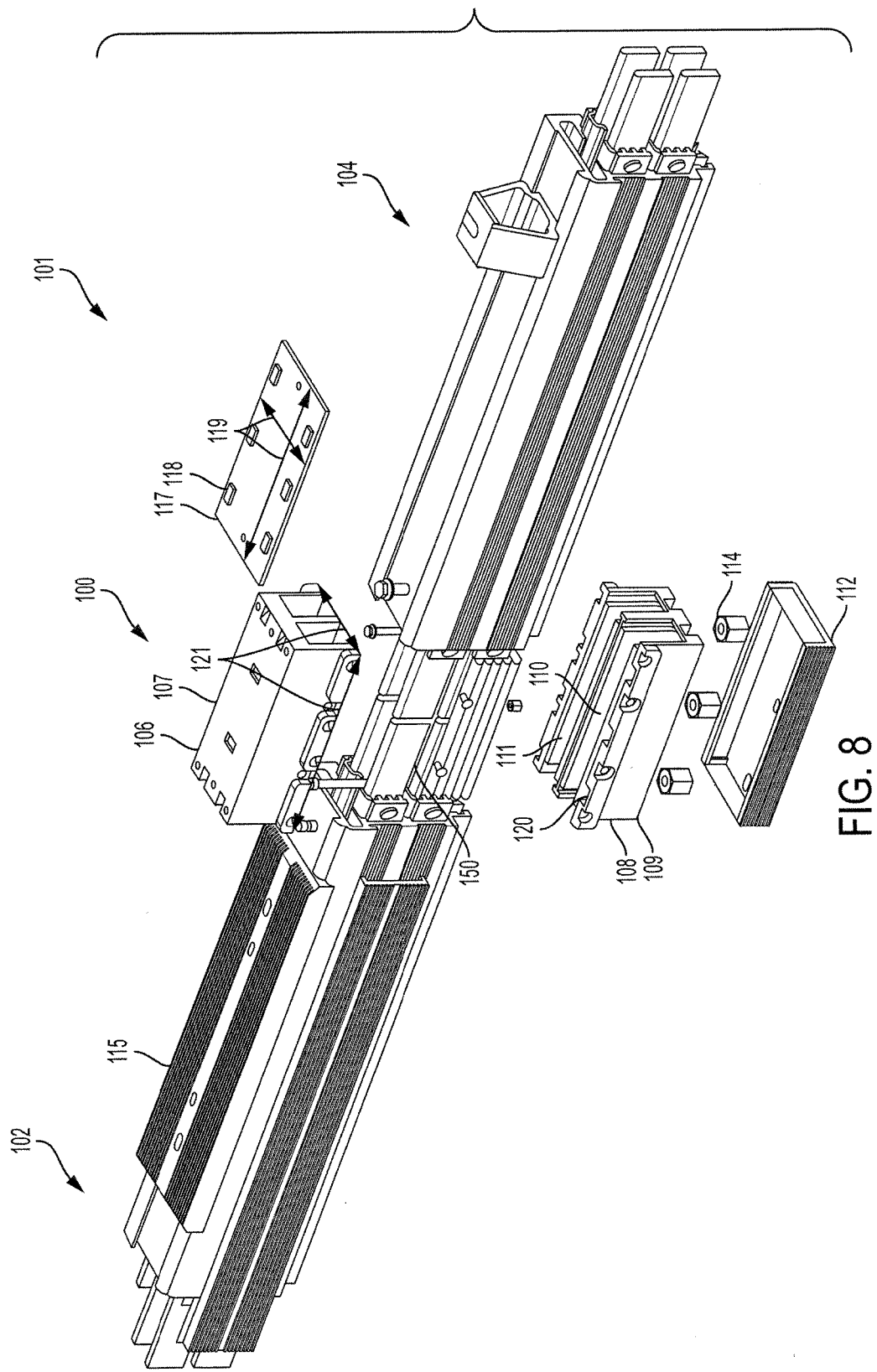
FIG. 8 is an exploded view illustrating components of another busway including a busway splice connector and two busway sections according to an embodiment of the present invention.

Turning to FIG. 8, another busway splice connector 100 can be used in a busway 101 to couple a first busway section 102 to a second busway section 104. The busway splice connector 100 includes a top coupler 106 and a bottom coupler 108. The bottom coupler 108 includes a lower housing 109 along with a first electrically conductive connector 110 and a second electrically conductive connector 111 positioned within the lower housing 109. The top coupler 106 includes an upper housing 107 along with two electrically conductive connectors (not shown) positioned within the upper housing 107. The features of each of the upper housing 107, the lower housing 109 and the electrically conductive connectors 110, 111 may be similar to or the same as the features of the upper housing 19, the lower housing 18 and the connectors 14, 15, 16, 17 of FIG. 1.

The busway splice connector 100 includes a ground strap 112 designed to be coupled to the lower housing 109. Three standoff insulators 114 are designed to be positioned between and space apart the lower housing 109 and the ground strap 112.

The busway splice connector 100 also includes a planar insulator 117. The planar insulator 117 has dimensions 119 that are similar to or substantially the same as dimensions 121 of a plane defined by a lower boundary of the upper housing 107 (i.e., by sides of the upper housing 107 nearest the lower housing 109). The planar insulator 117 includes a plurality of tongues 118 extending away from a top surface and a bottom surface of the planar insulator 117. The tongues 118 may interface with grooves 120 of the lower housing 109 and of the upper housing 107. In that regard and referring to FIGS. 8 and 9, when the top coupler 106 is coupled to the bottom coupler 108, the upper housing 107 and the lower housing 109 may be separated by the planar insulator 117. When the lower housing 109 is coupled to the upper housing 107, the tongues 118 of the planar insulator 117 may be received by the grooves 120. Thus, the tongues 118 and the grooves 120 resist movement of the planar insulator 117 relative to the upper housing 107 and the lower housing 109.

The planar insulator 117, the top coupler 106 and the bottom coupler 108 are designed such that when coupled together, a top surface 122 of the top coupler 106 is substantially aligned with a top surface 126 of the first busway section 102 and a top surface 127 of the second busway section 104. This provides several advantages. For example, axial ends of the upper housing 107 and the lower housing 109 may be directly in contact with outer casings 132, 134 of the busway sections 102, 104. This contact may allow heat to dissipate from the upper housing 107 and the lower housing 109 to the busway sections 102, 104. The heat dissipation may be sufficient such that the busway splice connector can adequately dissipate heat without inclusion of vents, such as the vent holes 72 of FIG. 1. Another benefit of the alignment of the top surfaces 122, 126 and 127 is improved aesthetic appeal.

The busway splice connector 100 also includes a ground plate 115, although the ground plate 115 may also or instead be provided with the first busway section 102. The ground plate 115 can be removably coupled to either of the busway sections 102, 104, can be slidably coupled to either of the busway sections 102, 104 and/or can be a separate component from either of the busway sections 102, 104.

Figure 9:
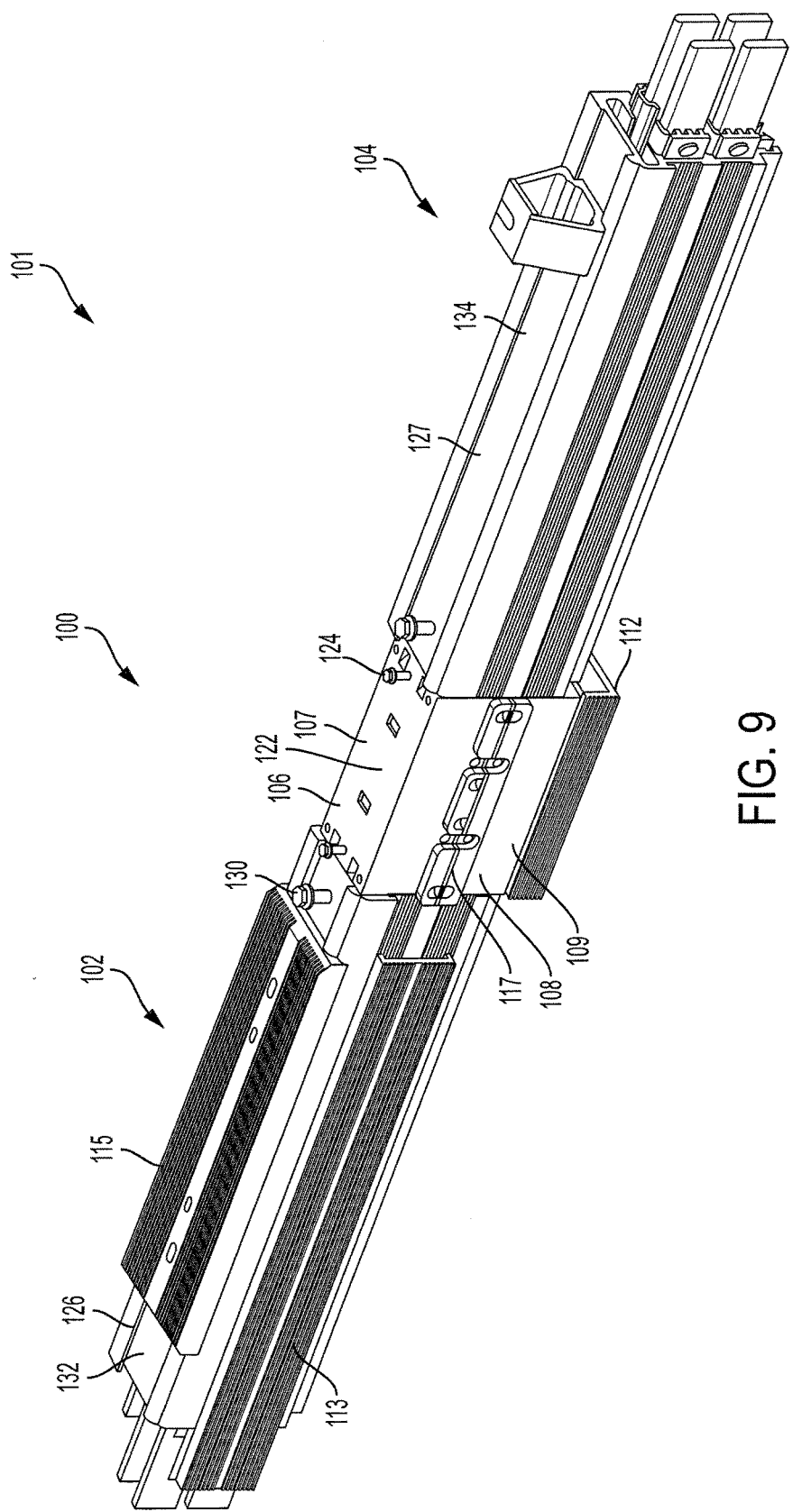
FIG. 9 is a drawing of the busway of FIG. 8 with the busway splice connector of FIG. 8 in a partially assembled state according to an embodiment of the present invention.
Figure 10:
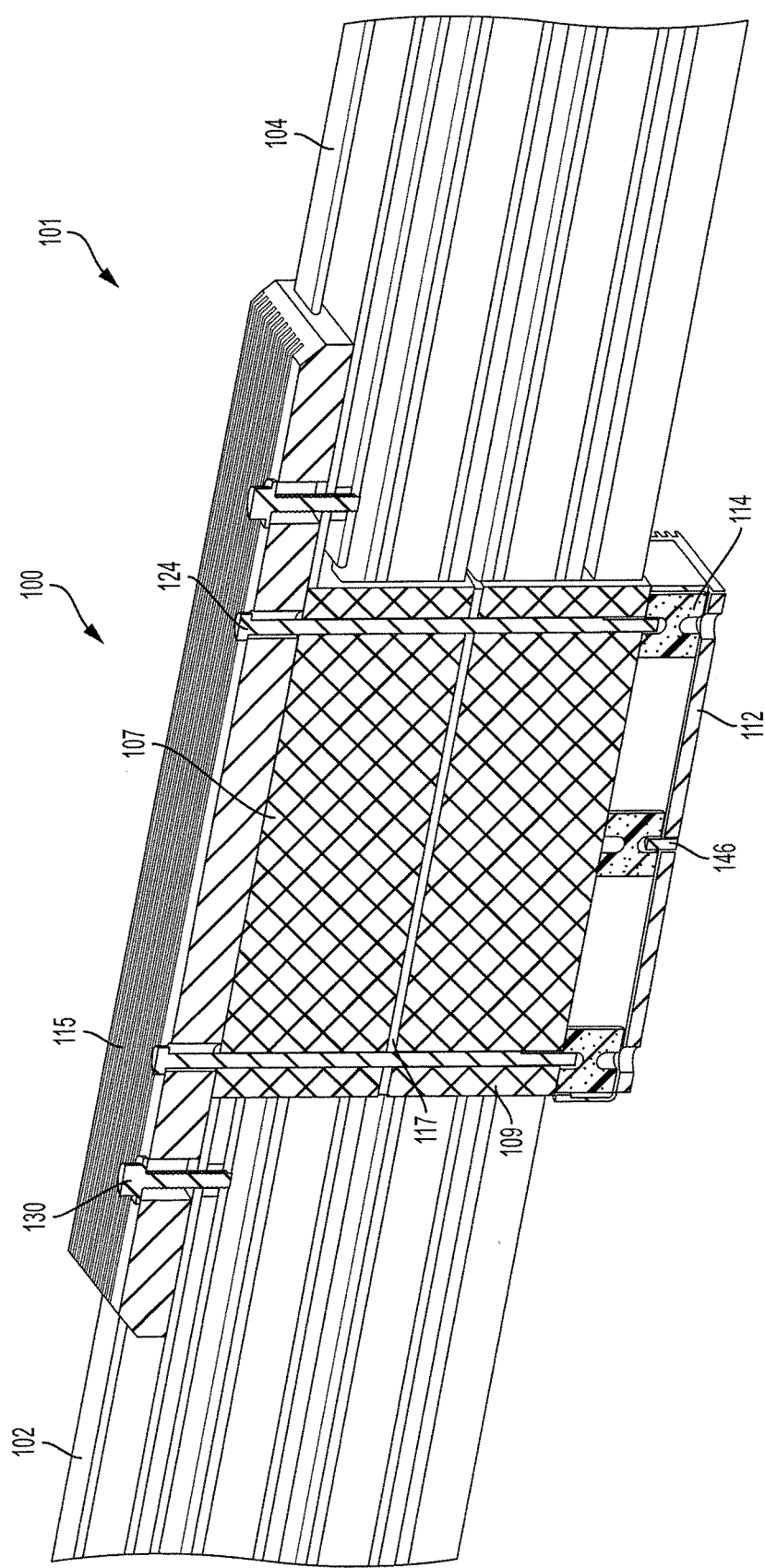
FIG. 10 is an enlarged cross-sectional view of the busway splice connector of FIG. 8 according to an embodiment of the present invention.

Referring to FIGS. 9 and 10, after the top coupler 106 and the bottom coupler 108 have been assembled about the busbars 150, the ground plate 115 can be slid or positioned over the upper housing 107. Because the top surface 122 of the upper housing 107 is aligned with the top surfaces 126, 127 of the busway sections 102, 104, the ground plate 115 may contact the top surface 122 of the upper housing 107 and the top surfaces 126, 127 of the busway sections 102, 104. This contact may allow for additional heat dissipation from the upper housing 107 to the busway sections 102, 104.

The ground plate 115 may be affixed to the busway sections 102, 104 and the couplers 106, 108. In particular, one or more fasteners 130 may be used to affix the ground plate 115 to the first busway section 102 and the second busway section 104. The fasteners 130 can include rivets, may be threaded or the like. When the busway sections 102, 104 and the ground plate 115 are fastened by the fasteners 130, the ground plate 115 may resist separation from the busway sections 102, 104 during relatively high current events.

Similarly, one or more fasteners 124 may extend through the ground plate 115, the upper housing 107, the planar insulator 117 and the lower housing 109. The one or more fasteners 124 may be received by one or more of the standoff insulators 114. The fasteners 124 may be received by and secured to the standoff insulators 114. In some embodiments, the fasteners 124 may compress the upper housing 107, the lower housing 109 and the planar insulator 117 between the ground plate 115 and the standoff insulators 114. Whether or not this compression occurs, the fasteners 124 couple together and resist separation of the ground plate, the upper housing 107, the lower housing 109, the planar insulator 117 and the standoff insulators 114 from each other during relatively high current events.

One or more fasteners 146 may be used to couple the ground strap 112 to the standoff insulators 114. The fasteners 146 may resist separation of the ground strap 112 from the standoff insulators 114 during relatively high current events. Due to the relatively small number of the fasteners 124 and the fasteners 146, assembly of the busway splice connector 100 about the busway sections 102, 104 is relatively easy and quick. Furthermore, replacement of any component of the busway splice connector 100 and/or component within one of the busway sections 102, 104 is relatively easily due to the relatively small number of fasteners. In some embodiments, one or more additional or alternative fasteners may be used to couple various components of the busway splice connector 100 together.

Returning reference to FIG. 9, the busway splice connector 100 and/or one or both busway sections 102, 104 may include a side plate 113. The side plate 113 may be removably coupled to, slidably coupled to or not coupled to one or both of the busway sections 102, 104. When the upper housing 107 is coupled to the lower housing 109, the side plate 113 may be positioned about an outer surface of the first busway section 102, the second busway section 104 and the busway splice connector. For example, the side plate 113 may be slid across an outer surface of the first busway section 102, the upper housing 107, the lower housing 109 and the second busway section 104. The busway splice connector 100 may be fully assembled when the fasteners 130, 124, 146 are fastened and when the side plate 113 is positioned as described above.

Figure 11:
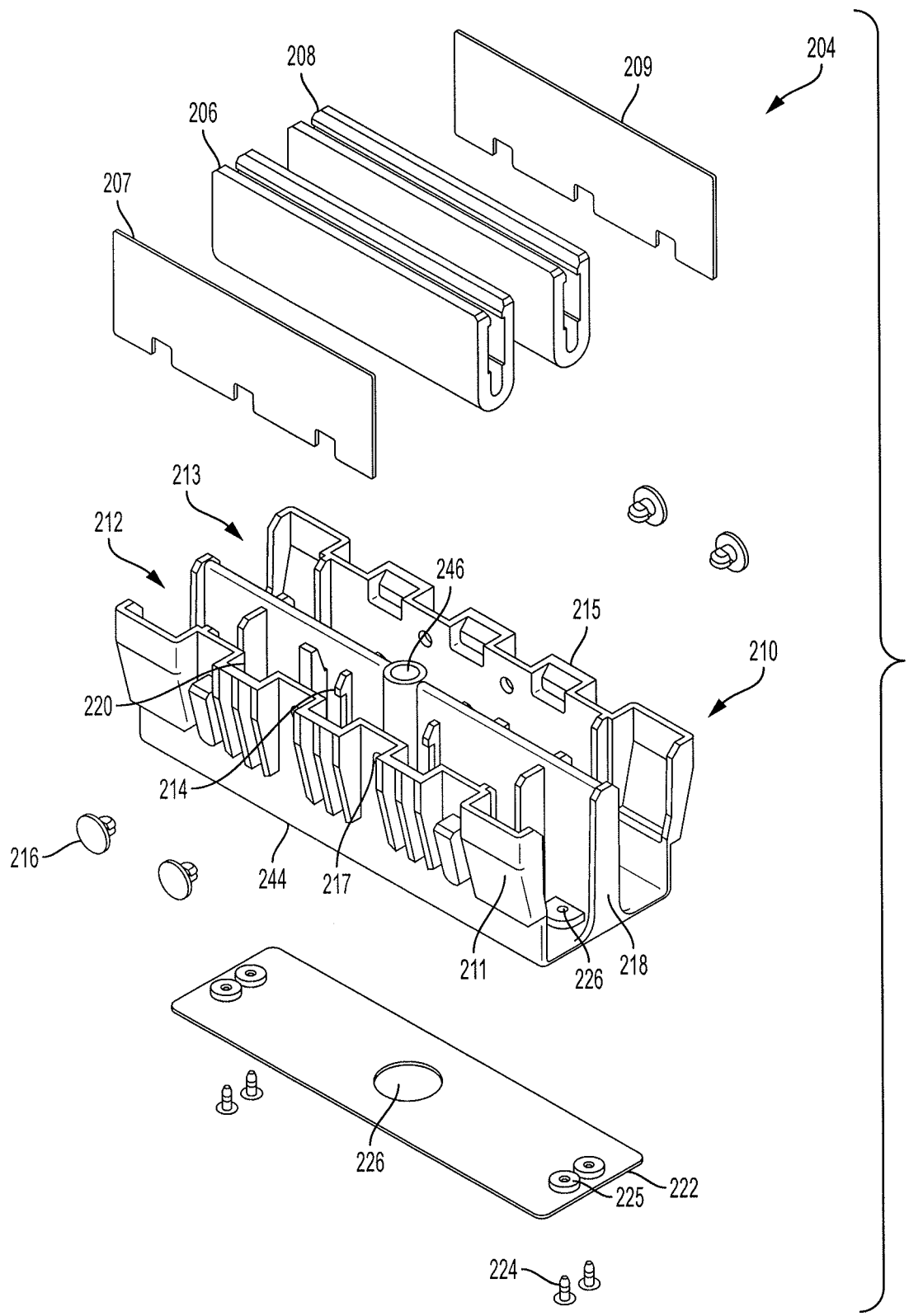
FIG. 11 is an exploded view of a bottom coupler of the busway splice connector of FIG. 8 according to an embodiment of the present invention.

Referring now to FIG. 11, another coupler (bottom coupler) 204 may be used as the top coupler 106 or the bottom coupler 108 of the busway splice connector 100 of FIG. 8, or as part of another busway splice connector. The bottom coupler 204 includes a lower housing 210, a first connector 206, a second connector 208 and a cover 222. The first connector 206 and the second connector 208 may be electrically conductive. The lower housing 210 defines a first compartment 212 and a second compartment 213 separated by an isolating wall 218.

The first compartment 212 is designed to receive the first connector 206 and the second compartment 213 is designed to receive the second connector 208. In some embodiments, the first connector 206 and the second connector 208 may snugly fit within the compartments 212, 213. When the connectors 206, 208 are received by the respective compartments 212, 213, detents or hooks 214 can extend over a top surface of the connectors 206, 208 to restrict movement of the connectors 206, 208 relative to the lower housing 210.

In some embodiments, the connectors 206, 208 may be designed for a system having relatively small busbars. In that regard, the connectors 206, 208 may have smaller dimensions than the compartments 212, 213. To compensate for the smaller dimensions, spacers 207, 209 may be placed in the compartments 212, 213 along with the connectors 206, 208. The spacers 207, 209 may be positioned between the connectors 206, 208 and the respective sidewall 211, 215 and/or between the connectors 206, 208 and the isolating wall 218. For example, the first connector 206 may be positioned adjacent to the isolating wall 218 with the spacer 207 positioned between the first connector 206 and the sidewall 211. Together, the connectors 206, 208 and the spacers 207, 209 may snugly fit within the respective compartments 212, 213, and in some embodiments may be coupled in place via a snap fit or interference fit connection.

Fasteners 216 may extend through apertures 217 of the lower housing 210 to further secure the connectors 206, 208 and the spacers 207, 207 within the compartments 212, 213. The fasteners 216 may contact the respective spacer 207, 209 and force the respective spacer 207, 209 towards the respective one of the connectors 206, 208, which resists movement due to contact and potential friction with the isolating wall 218. When the fasteners 216 are in place, the spacers 207, 209 and the connectors 206, 208 may be coupled in the compartments 212, 213 via an interference fit or snap fit connection. Stated differently, friction between the isolating wall 218, the first connector 206, the spacer 209 and the fasteners 216 may be sufficient to retain the first connector 206 and the spacer 209 within the first compartment 212. In some embodiments, the fasteners 216 may be rivets, threaded fasteners or the like.

The isolating wall 218 may define a tubular structure defining an opening 246 that extends through the lower housing 210. Functionality of the opening 246 will be described below with reference to FIG. 14.

The bottom coupler 204 may be used as a top/bottom coupler and as a top/bottom end feed coupler, as will be described below. A removable cover 222 may be coupled to an outer face 244 of the lower housing 210 to convert the bottom coupler 204 from an end feed coupler to a bottom coupler. The cover 222 may be attached to the outer face 244 via fasteners 224 that extend through apertures 225 of the cover 222 and through apertures 226 of the lower housing 210. The fasteners may be, for example, rivets, threaded fasteners or the like. With brief reference to FIG. 18, the cover 222 may cover windows 264, 265 through which tabs 262, 263 of end feed connectors 258, 259 extend.

Figure 12:
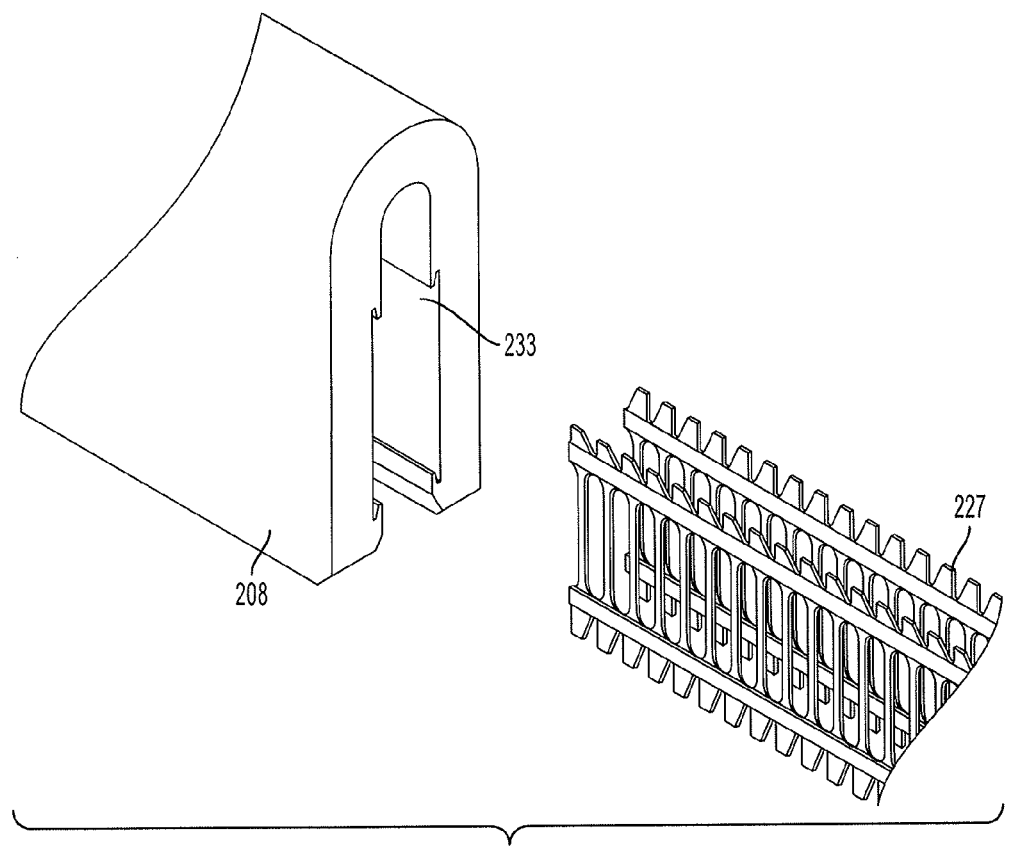
FIG. 12 is a drawing of a connector of the bottom coupler of FIG. 11 along with a pair of multi-contact louvers to be inserted into the connector according to an embodiment of the present invention.

Turning to FIG. 12, the connector 208, as with any other connector described herein, can define a dovetail groove 233 on both inner surfaces. Referring briefly to FIGS. 5 and 12, louvers 227 may be designed to fit into the dovetail groove 233 in the same manner as the louvers 35, 36 fit in the dovetail grooves 37, 38.

Figure 13:
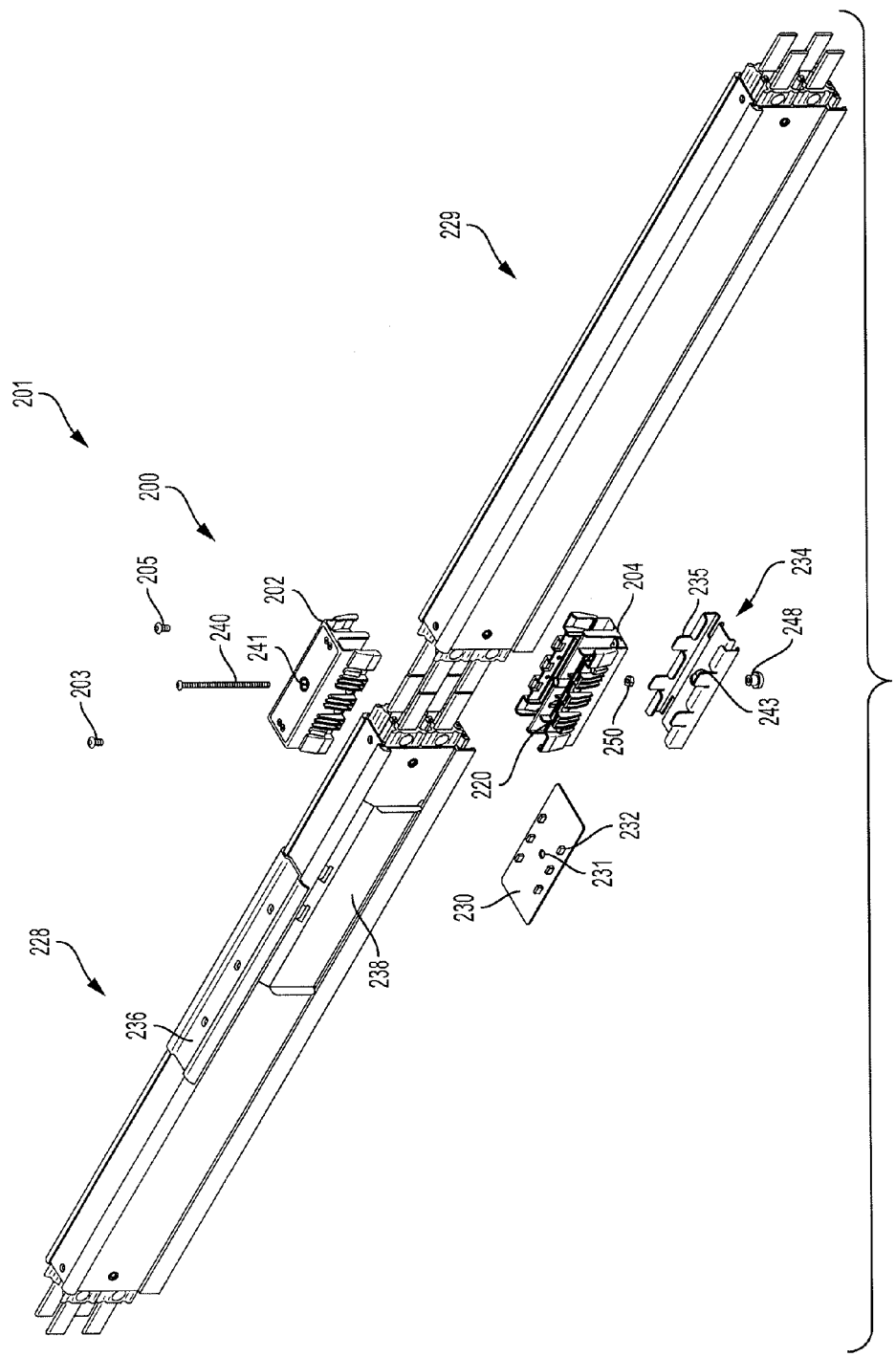
FIG. 13 is an exploded view of another busway section including a busway splice connector and two busway sections according to an embodiment of the present invention.

Turning now to FIG. 13, the bottom coupler 204 and a similar top coupler 202 may be used together as a busway splice connector 200 in a busway 201. The busway 201 can include a first busway section 228, a second busway section 229 and the busway splice connector 200. The busway splice connector 200 can also include a planar insulator 230 having tongues 232 designed to be received by grooves 220 of the couplers 202, 204. In some embodiments, the couplers 202, 204 may include tongues and the planar insulator 230 may include grooves. The busway splice connector 200 can also include a ground strap 234 designed to be coupled to the bottom of the bottom coupler 204.

Figure 14:
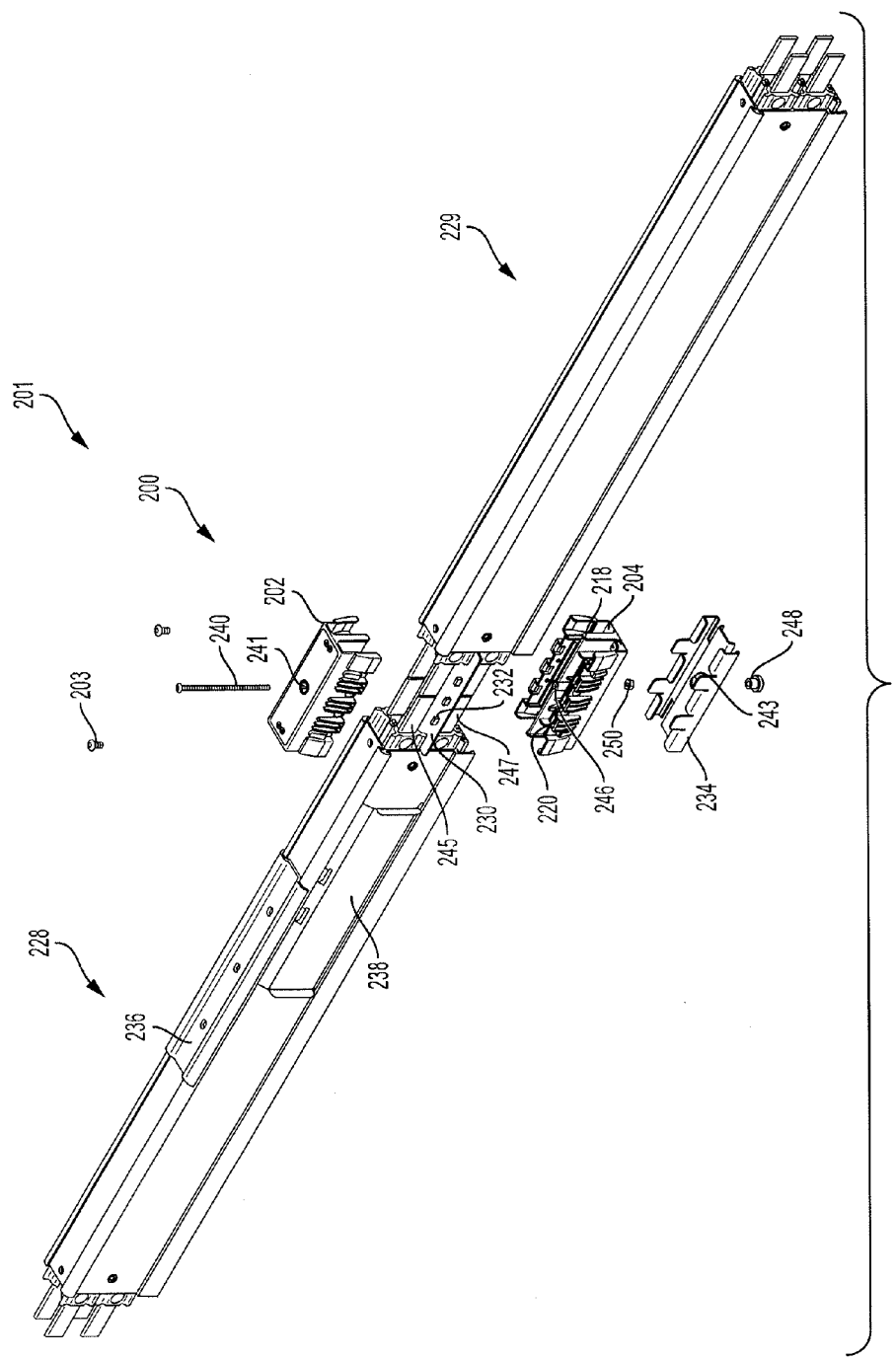
FIG. 14 is an exploded view of the busway splice connector of FIG. 13 including an insulator positioned between top busbars and bottom busbars according to an embodiment of the present invention.

Turning to FIG. 14, the planar insulator 230 is positioned between upper busbars 245 and lower busbars 247. When the planar insulator 230 is positioned between the upper busbars 245 and the lower busbars 247, the top coupler 202 and the bottom coupler 204 may be positioned about the busbars. The top coupler 202 and the bottom coupler 204 may be held together such that the tongues 232 of the planar insulator 230 are received by the grooves 220 of the bottom coupler 204 and the top coupler 202.

Figure 15:
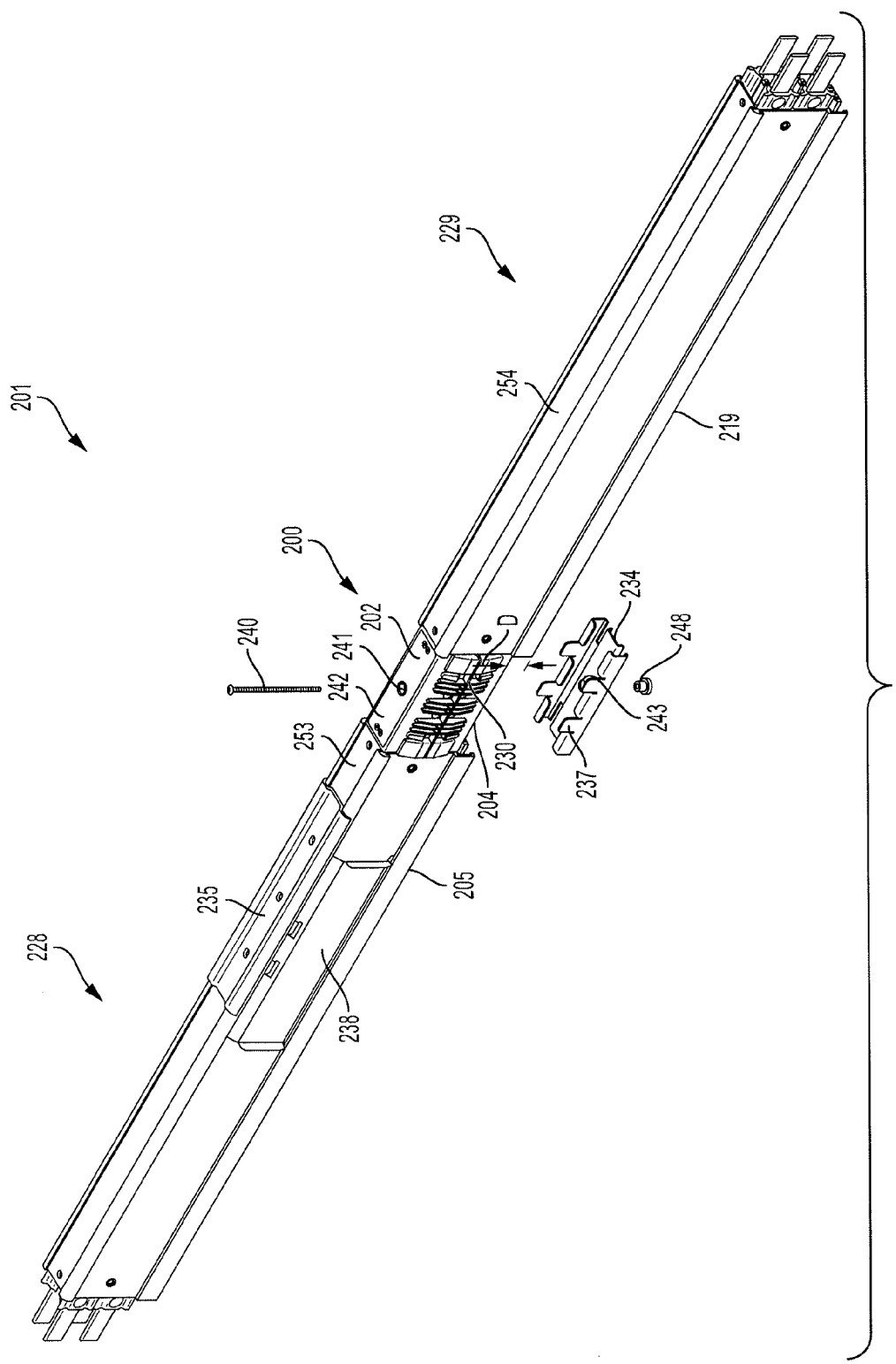
FIG. 15 is a drawing of the busway of FIG. 13 with the busway splice connector partially assembled according to an embodiment of the present invention.

Turning to FIG. 15, when the top coupler 202 and the bottom coupler 204 are positioned adjacent each other, the planar insulator 230 may space apart the top coupler 202 from the bottom coupler 204. The dimensions of the top coupler 202, the bottom coupler 204 and the planar insulator 230 may be such that a top surface 242 of the top coupler 202 is substantially parallel to a top surface 253 of the first busway section 228 and a top surface 254 of the second busway section 229. Side surfaces of the top coupler 202 and the busway sections 228, 229 may also be aligned. This alignment creates contact surface between the top coupler 202 and the busway sections 228, 229 when the busway splice connector 200 is assembled such that heat may transfer from the top coupler 202 to the busway sections 228, 229. In that regard, the top coupler 202 may sufficiently dissipate heat via the busway sections 228, 229 without utilizing vent holes. The bottom coupler 204 may likewise be in contact with a bottom surface 205 of the first busway section 228 and a bottom surface 219 of the second busway section 229 and/or may be separated therefrom.

The ground strap 234 may be coupled to the bottom coupler 204 and may include planar tongues 237. The planar tongues 237 may contact the outer surfaces of the bottom coupler 204 and resist movement of the ground strap 234 relative to the bottom coupler 204 when the busway splice connector 200 is assembled.

A ground plate 235 and a side plate 238 may be removably coupled, slidably coupled or not coupled to the first busway section 228 and/or the second busway section 229. When the top coupler 202, the bottom coupler 204 and the planar insulator 230 are positioned as shown in FIG. 15, the ground plate 235 may be slid or positioned above the top surface 242 of the top coupler 202 and the top surfaces 253, 254 of the busway sections 228, 229. Likewise, the side plate 238 may be slid or positioned adjacent to the top coupler 202 and the bottom coupler 204, as well as the busway sections 228, 229. This configuration is illustrated in FIG. 16.

Figure 16:
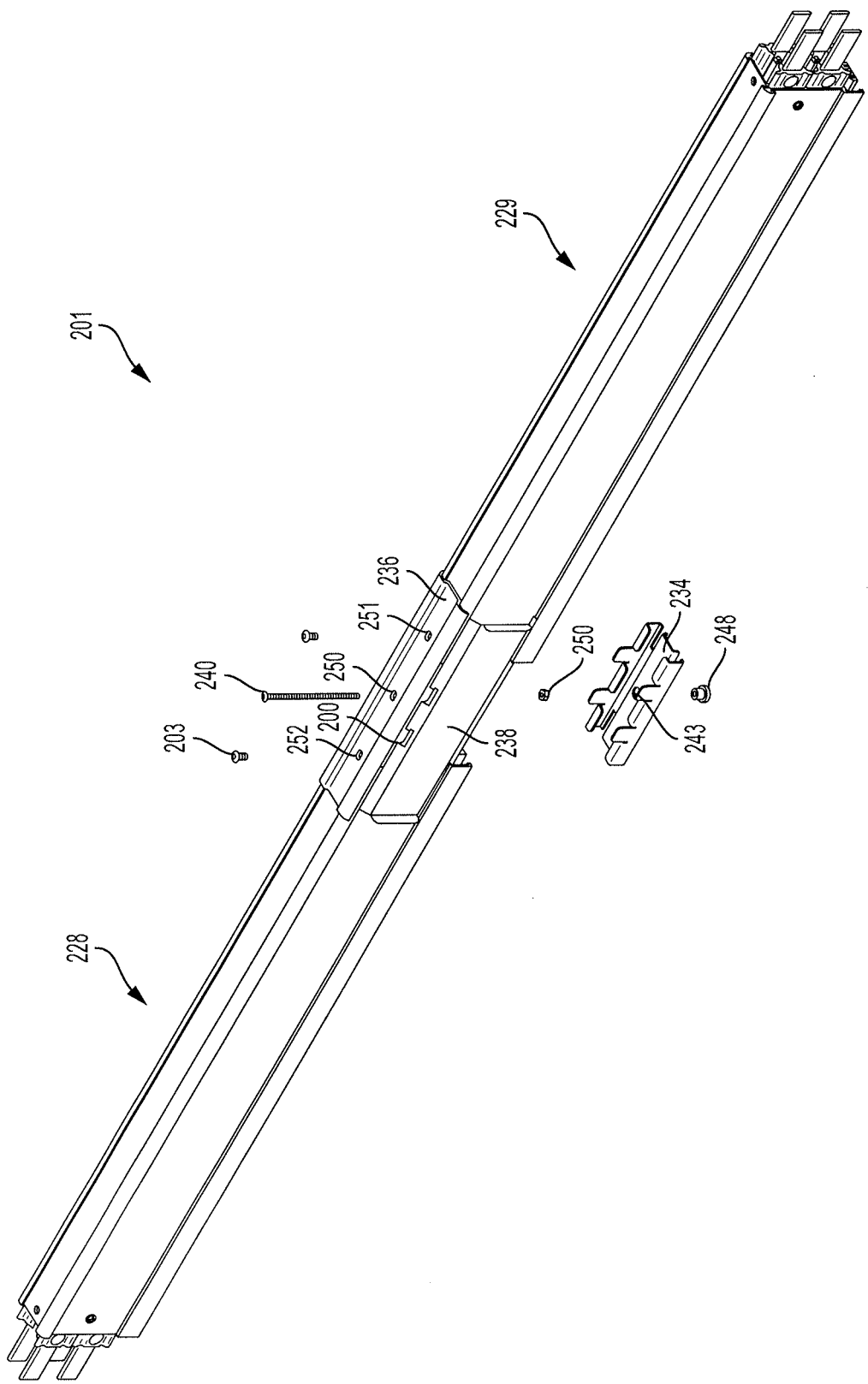
FIG. 16 is a drawing of the busway of FIG. 13 with the busway splice connector partially assembled according to an embodiment of the present invention.

Referring to FIGS. 13, 14 and 16, fasteners 203 may be used to couple the ground plate 236 to the first busway section 228 and the second busway section 229. Likewise, a fastener 240 may be usable to couple the components of the busway splice connector 200 together after the ground plate 236 and the side plate 238 are slid over the couplers 202, 204. The fastener 240 may extend through an opening 241 of the top coupler 202, an aperture 231 of the planar insulator 230 and the opening 246 of the bottom coupler 204. The fastener 240 may also extend through a washer 250 that is positioned between the bottom coupler 204 and the ground strap 234. The fastener 240 may also extend through an aperture 243 of the ground strap 234 after which it may be received by a nut 248. The fastener 240 may then be fastened to the nut 248, which may or may not compress components between the top coupler 202 and the ground strap 234. Regardless, the fastener 240 and nut 248 may couple the components of the busway splice connector 200 together. When coupled in this manner, the components of the busway splice connector 200 may resist separation during relatively high current events. Assembly and replacement of parts of the busway splice connector 200 is relatively easy and quick due to the relatively small quantity of fasteners used.

Figure 17:
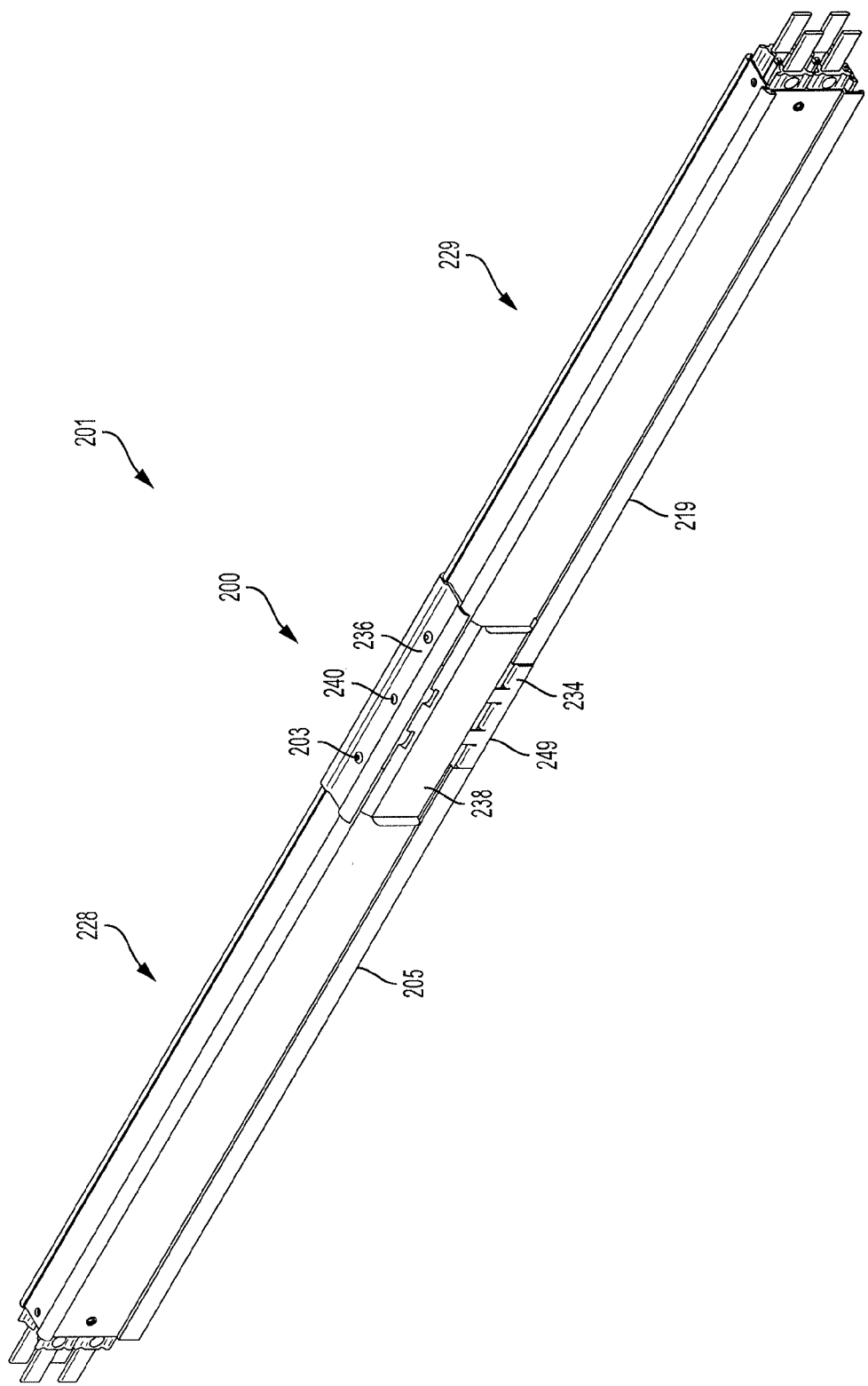
FIG. 17 is a drawing of the busway of FIG. 13 with the busway splice connector assembled according to an embodiment of the present invention.

Turning to FIG. 17, the busway splice connector 200 is shown assembled onto the first busway section 228 and the second busway section 229. When fully assembled, a bottom surface 249 of the ground strap 234 may be aligned with the bottom surfaces 205, 219 of the busway sections 228, 229. This provides additional contact surface between the busway splice connector 200 and the busway sections 228, 229, allowing heat to transfer from the busway splice connector 200 to the busway sections 228, 229. In that regard, contact between the busway splice connector 200 and the busway sections 228, 229 may provide sufficient cooling without use of vent openings.

Figure 18:
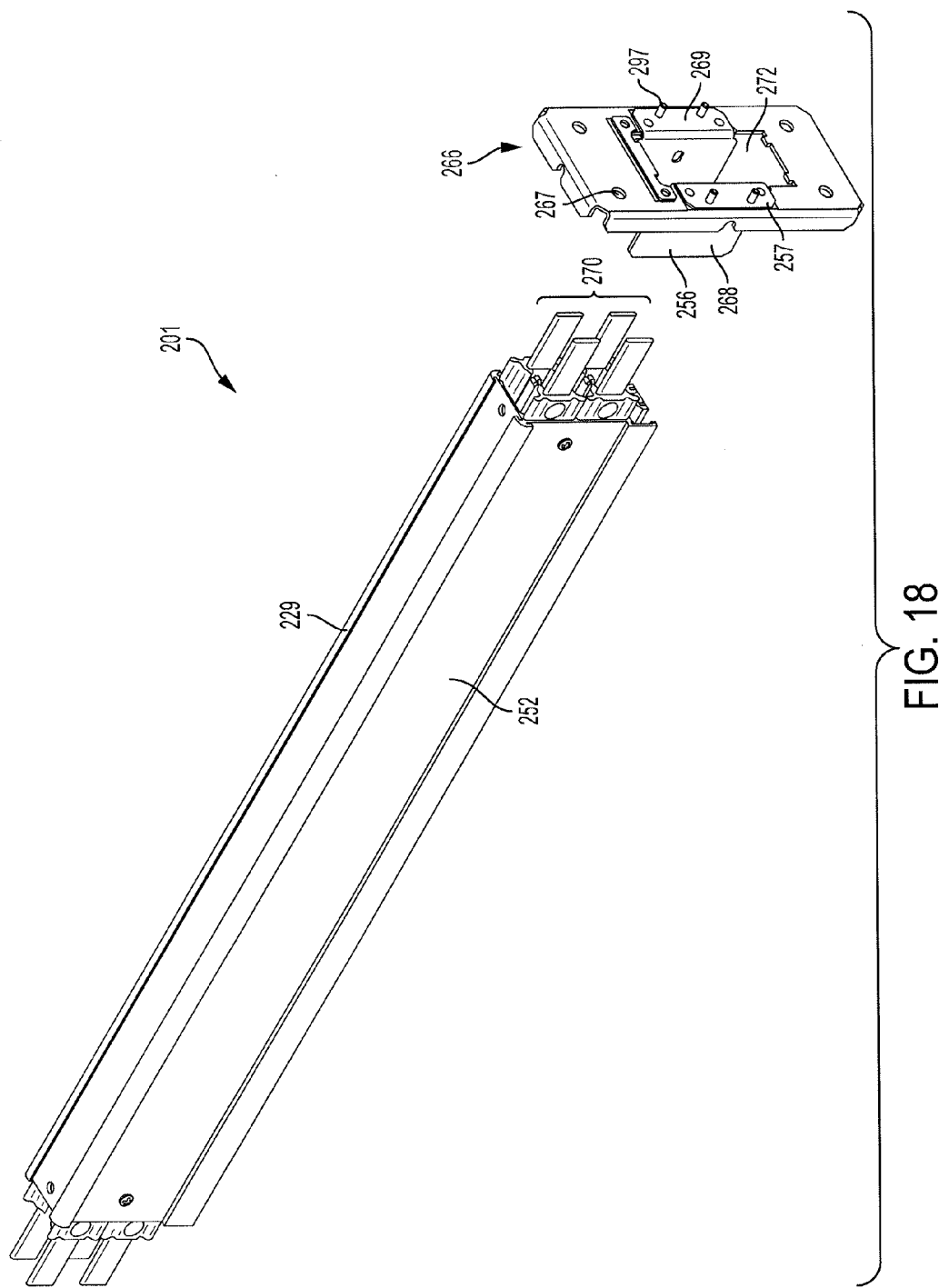
FIG. 18 is a drawing of one of the busway sections of FIG. 13 that is to be used at an end of the busway and an end feed plate to be coupled to the one busway section according to an embodiment of the present invention.

Turning now to FIG. 18, the second busway section 229 may be the last busway section of the busway 201. An end feed plate 266 can be positioned about the second busway section 229 such that the busbar ends 270 of the second busway section 229 can extend through a window 272 defined by the end feed plate 266.

As shown, the end feed plate 266 can include two L-brackets 268, 269. The L-bracket 268 can include a first section 256 and a second section 257. The first section 256 can be positioned parallel to the second busway section 229 and align with a groove 252 defined by the second busway section 229. In that regard, the first section 256 can be received by the groove 252. In some embodiments, the groove 252 may be a dovetail groove such that the first section 256 of the L-bracket 268 is held in place due to being received by the groove 252. The second section 257 may be parallel to the window 272 and may have studs 297 extending outward therefrom.

Figure 19:
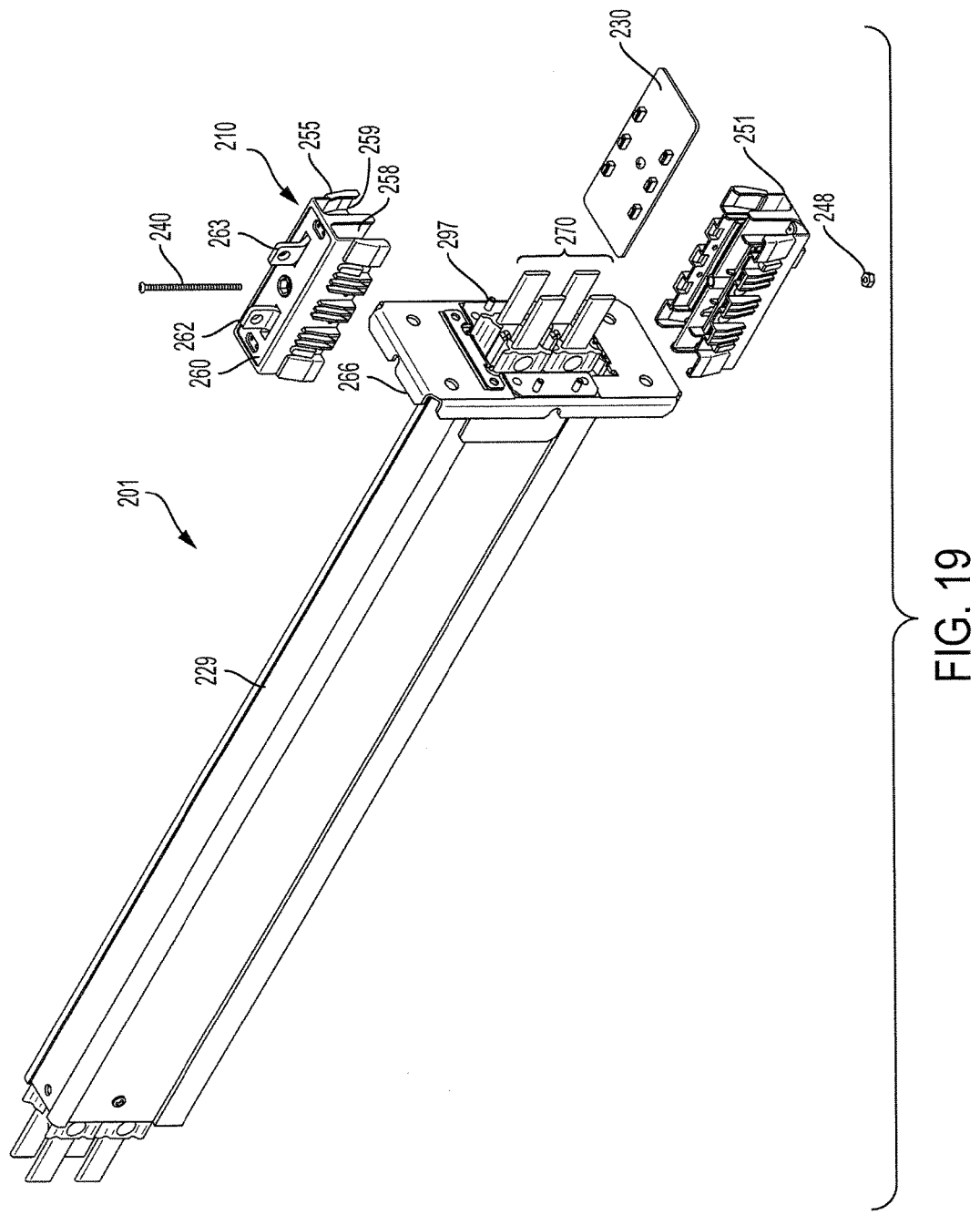
FIG. 19 is a drawing of the busway section of FIG. 18 including an exploded view of an end feed coupler according to an embodiment of the present invention.

Turning to FIG. 19, a busway end feed coupler 239 can be coupled to the second busway section 229 after the end feed plate 266 is positioned about the busbar ends 270. The busway end feed coupler 239 can include a top end feed coupler section 255 and a bottom end feed coupler section 251, along with a planar insulator 230. As mentioned above, end feed coupler sections can be assembled using the same housings as the couplers for busway splice connectors. For example, the top end feed coupler section 255 can use the same housing 210 as the bottom coupler 204 of FIG. 11 and/or a similar housing. The planar insulator 230 may be the same planar insulator used for busway splice connectors between busway sections.

Figure 20:
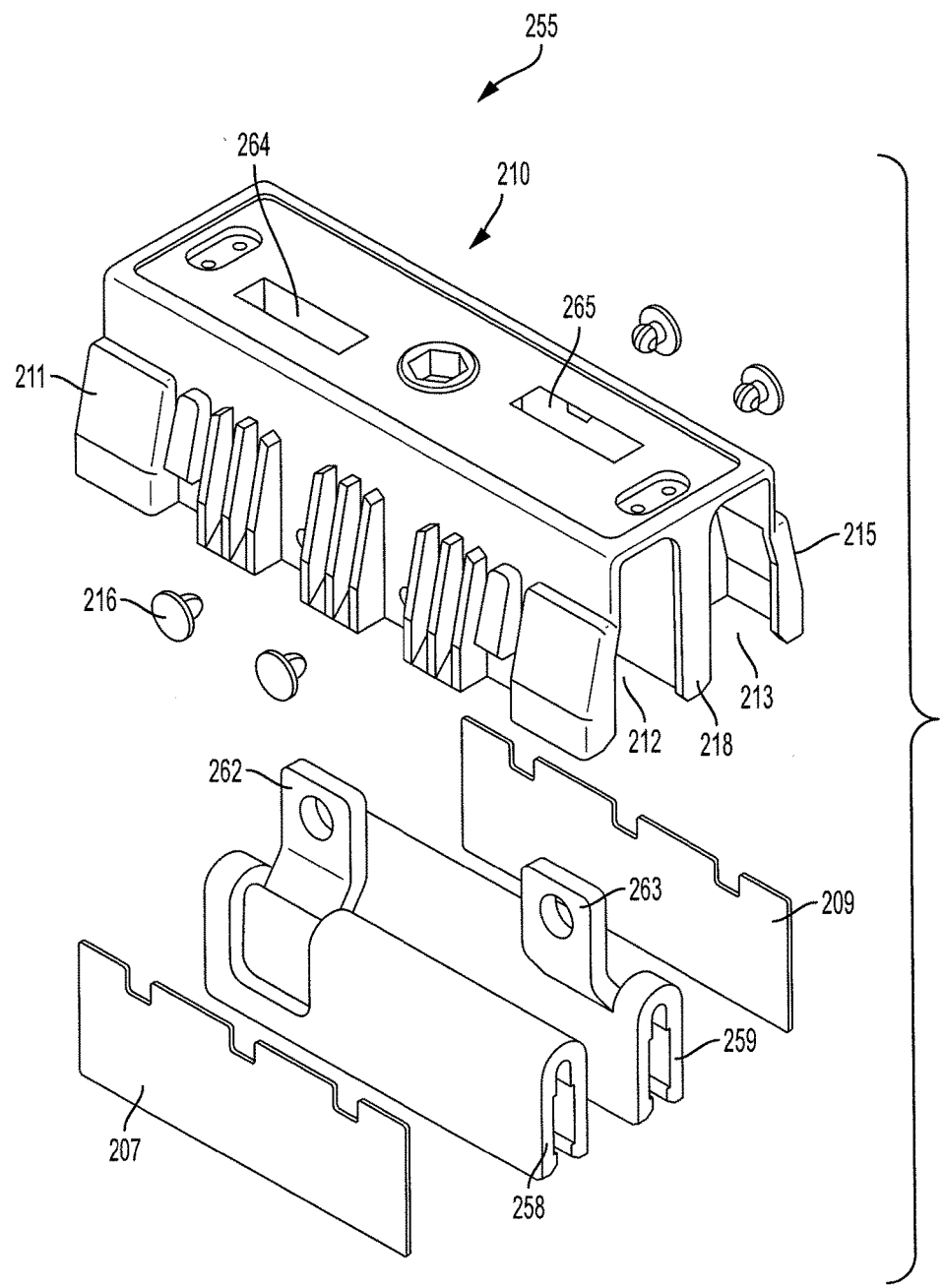
FIG. 20 is a drawing of an end feed coupler section of the end feed coupler of FIG. 19 according to an embodiment of the present invention.

Turning now to FIG. 20, the top end feed coupler section 255 can include two end feed connectors 258, 259 which may include a U-shape. The end feed connector 258 includes a tab 262 extending away from the apex of the U and the end feed connector 259 includes a tab 263 also extending away from the apex of the U. In some embodiments, end feed connectors may have a shape other than a U and may still include tabs 262, 263 extending away from an end of the end feed connectors. The end feed connectors 258, 259 are designed to fit within the compartments 212, 213 of the lower housing 210 between the sidewalls 211, 215 and the isolating wall 218.

The cover 222 of FIG. 11 is not coupled to the lower housing 210. This causes the windows 264, 265 to remain exposed or unobstructed such that the tabs 262, 263 can extend therethrough.

In some embodiments, the end feed connectors 258, 259 may fit snugly within the compartments 212, 213. However, in some embodiments, the dimensions of the end feed connectors 258, 259 may be smaller than that of the compartments 212, 213. In that regard, the spacers 207, 209 may be positioned within the compartments 212, 213 along with the end feed connectors 258, 259. The spacers 207, 209 and the end feed connectors 258, 259 may optionally be further secured within the compartments 212, 213 using the fasteners 216. Thus and referring briefly to FIGS. 11, 13, 19 and 20, the busway splice connector 200 may be used as the end feed coupler 254 by exclusion of the cover 222 and the connectors 206, 208 and by inclusion of the end feed connectors 258, 259. Thus, a separate end feed coupler design is not required to complete the busway 201.

Returning to FIG. 19, the tabs 262, 263 may extend outward from a top surface 260 of the top end feed coupler section 255. Similar tabs may extend outward from a bottom surface of the bottom end feed coupler section 251. Each of the tabs 262, 263 may be coupled to an external power source. In that regard, current may flow from the power source, through the tabs 262, 263 and, thus, the end feed connectors 258, 259. From the end feed connectors 258, 259, current may then flow to a corresponding busbar end 270 of the second busway section 229.

To assemble the busway end feed coupler 239, the planar insulator 230 may be positioned between the upper and lower busbar ends 270. The top end feed coupler section 255 and the bottom end feed coupler section 251 may be positioned such that their open ends (i.e., ends that receive the busbar ends 270) face each other and contact the planar insulator 230. The fastener 240 may extend through the end feed couplers and the planar insulator 230 and be received by the nut 248. The fastener 240 may then be fastened to the nut 248, causing compression and/or otherwise resisting separation of the components of the busway end feed coupler 239.

Figure 21A:
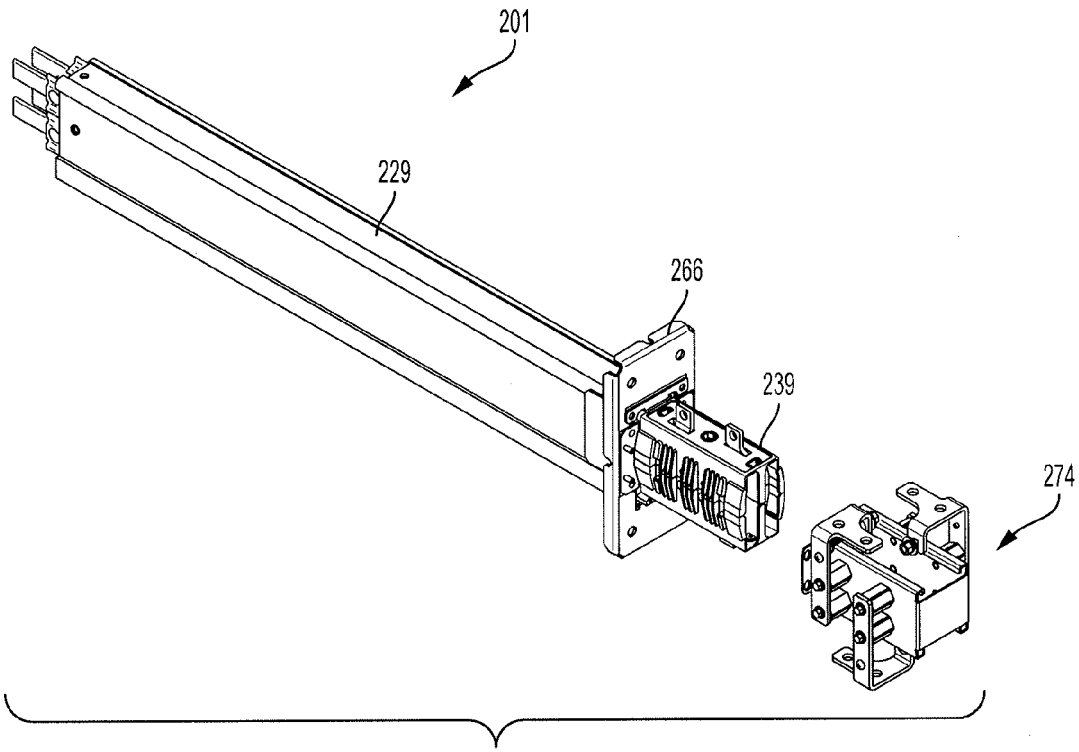
FIG. 21A is a drawing of the end feed coupler of FIG. 19 and a corresponding end feed coupler support according to an embodiment of the present invention.
Figure 21B:
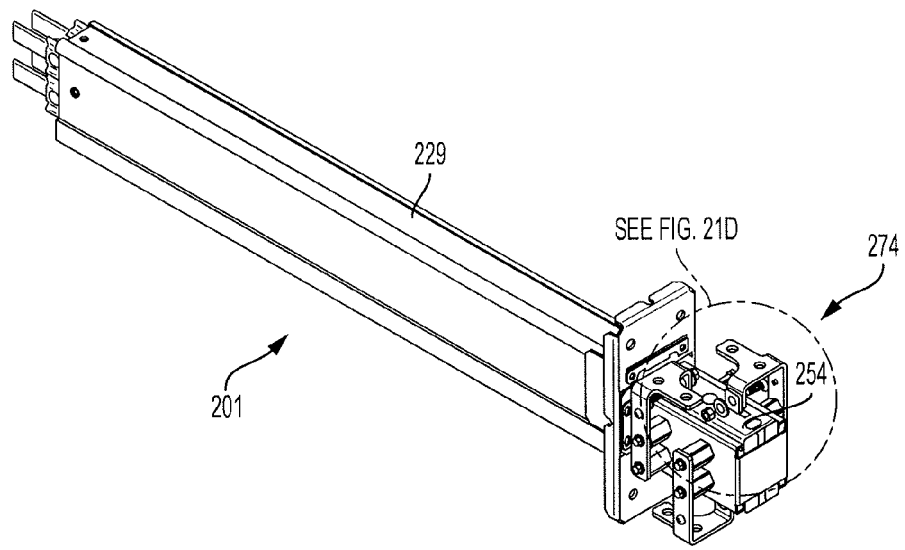
FIG. 21B is a drawing of the end feed coupler support of FIG. 21A coupled to the end feed coupler of FIG. 19 according to an embodiment of the present invention.
Figure 21C:
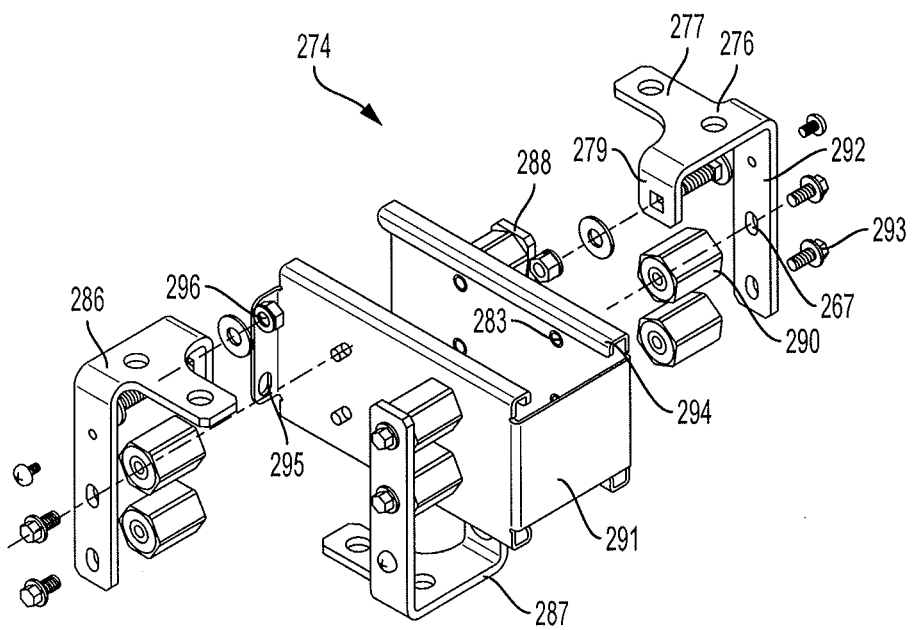
FIG. 21C is an exploded view of the end feed coupler support of FIG. 21A according to an embodiment of the present invention.

Referring to FIGS. 21A and 21B, an end feed coupler support 274 is designed to be positioned about, and coupled to, the busway end feed coupler 239. Turning now to FIG. 21C, the end feed coupler support 274 includes a landing pad corresponding to each tab, including a landing pad 276 corresponding to the tab 263. The landing pad 276 may be coupled to the tab 263 such that power can flow between the tab 263 and the landing pad 276.

The end feed coupler support 274 can include a casing 291 and four landing pads 276, 286, 287, 288 coupled thereto. Each landing pad may have similar characteristics. The landing pad 276 includes a wing 279, a diving board 277 and an elongate section 292. The elongate section 292 defines two apertures 267. Two insulator standoffs 290 may be positioned between the elongate section 292 and the casing 291 of the end feed coupler support 274. Fasteners 293 may extend through the apertures 267 and the insulator standoffs 290 and be received by apertures 283 of the casing 291, thus fastening the landing pad 276 to the casing 291. The insulator standoffs 290 reduce the likelihood of current flowing from the landing pad 276 to the casing 291.

The casing 291 defines inward-extending lips 294. With brief reference to FIGS. 21C and 21D, the lips 294 may exert a compressive force on the busway end feed coupler 239 and/or may be sufficient such that the end feed coupler 239 may be coupled to the casing 291 via a press fit or interference fit. This coupling resists movement of the busway end feed coupler 239 relative to the end feed coupler support 274.

Referring to FIGS. 19 and 21C, the casing 291 defines a flange 296 that is designed to mate with the end feed plate 266. In particular, the studs 297 extending from the end feed plate 266 may be received by slots 295 of the flange. The studs 297 and slots 295 may interface to ensure alignment of the end feed coupler support 274 and the end feed plate 266 and, thus, the second busway section 229.

Figure 21D:
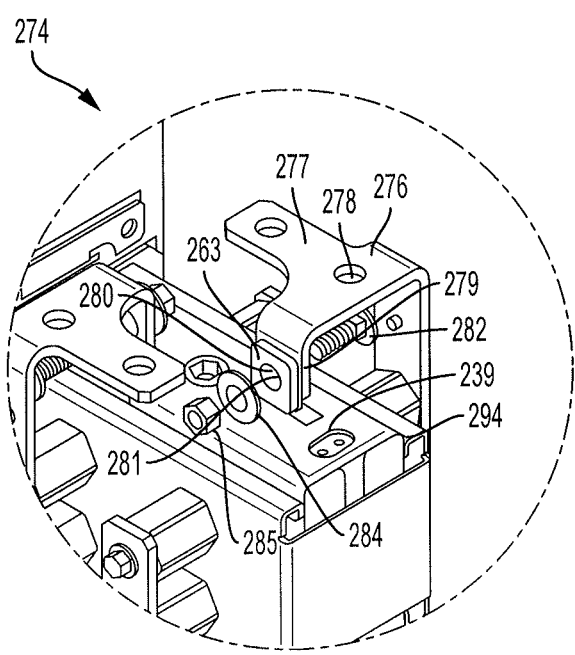
FIG. 21D is an enlarged view of the end feed coupler support of FIG. 21A coupled to the end feed coupler of FIG. 19 according to an embodiment of the present invention.

Referring now to FIGS. 19 and 21D, the landing pad 276 includes two holes 278 for landing two-terminal lugs (not shown) from the power supply (not shown). For example, the holes 278 may be positioned on the diving board 277. Power may transfer to the landing pad 276 from the two-terminal lugs. From the landing pad 276, the power may flow through the tab 263 and the end feed connector 259 to the corresponding busbar end 270 of the second busway section 229.

With renewed reference to FIG. 21D, the landing pad 276 may be coupled to the tab 263 via a fastener 282. In particular, the landing pad can include a wing 279 that aligns with the tab 263. An aperture 280 of the wing 279 may be aligned with an aperture 281 of the tab 263. The fastener 282 may extend through the apertures 280, 281 and an optional washer 284. A nut 285 may then receive and be fastened to the fastener 282. When the nut 285 is fastened to the fastener 282, the tab 263 and the wing 279 of the landing pad 276 may be pressed together with sufficient force that current may flow therebetween.

Figure 22:
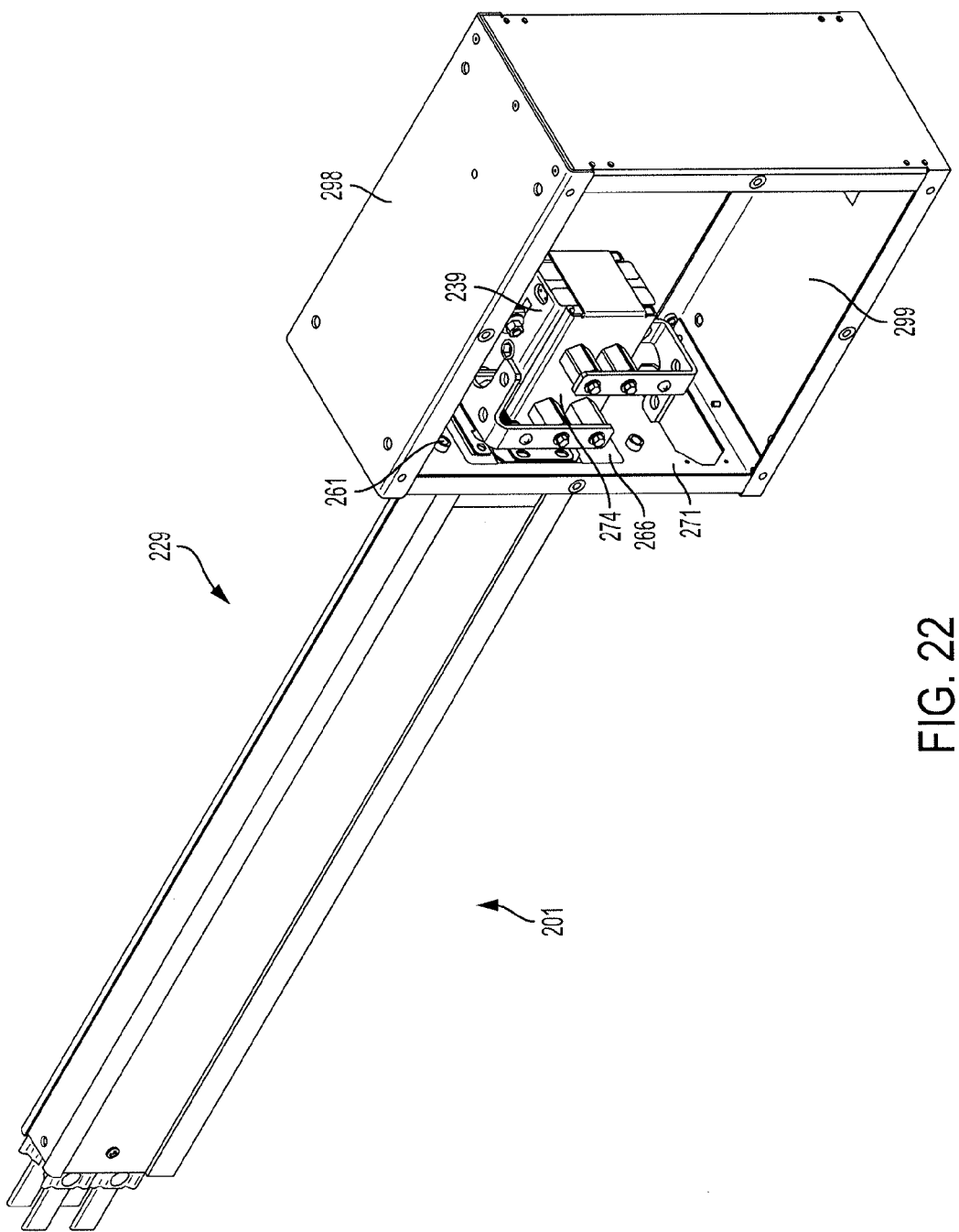
FIG. 22 is a drawing of the end feed coupler of FIG. 19 and the end feed coupler support of FIG. 21A positioned within a box according to an embodiment of the present invention.

Turning now to FIG. 22, a box 298 may define a volume 299 in which the busway end feed coupler 239 and the end feed coupler support 274 can be positioned. A side 271 of the box 298 can be positioned between the end feed coupler support 274 and the end feed plate 266. Referring briefly to FIGS. 18 and 22, the side 271 of the box 298 can define apertures 261 that may align with apertures 267 of the end feed plate 266. A fastener (not shown) can extend through the apertures 261 of the box 298 and through the apertures 267 of the end feed plate 266 and can be fastened to secure the box 298 to the end feed plate 266 and, thus, the second busway section 229.

The box 298 can be mounted to a wall, ceiling, floor or other structure. A cable through-hole (not shown) can be punched into one or more sides of the box 298. Cables from the power supply (i.e., from a utility) can extend through the cable through-hole and be connected to the end feed coupler support 274 and, thus, the end busway feed coupler 239. A last side (not shown) may be coupled to the box 298 such that the volume 299 is sealed from the environment except for the cable through-hole. In that regard, the box 298 can isolate and/or protect components of the busway end feed coupler 239 and the end feed coupler support 274, as well as protect passers-by from electrocution.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A busway splice connector comprising:
    a first connector and a second connector each defining a busbar volume for receiving a portion of two busbars;
    a first housing defining a first compartment for receiving the first connector;
    a second housing defining a second compartment for receiving the second connector;
    an insulator configured to be positioned between the first housing and the second housing and to insulate the first connector from the second connector when the busway splice connector is assembled;
    and wherein the first housing, the second housing and the insulator each define an aperture configured to be aligned when the busway splice connector is assembled and to receive a fastener for coupling the first housing, the second housing and the insulator to each other.

2. The busway splice connector of claim 1 further comprising a ground plate defining an aperture designed to be aligned with the aperture of the first housing, the second housing and the insulator such that the fastener can also extend through the ground plate and fasten the ground plate to the first housing, the second housing and the insulator, wherein the ground plate is configured to be positioned across the first housing and a surface of adjacent busway sections and to be fastened to the surface of the adjacent busway sections to resist separation of the first housing from the adjacent busway sections.

3. The busway splice connector of claim 1 further comprising a ground strap configured to be positioned across the second housing and a standoff insulator configured to be coupled to the ground strap and to receive the fastener such that the fastener resists separation of the ground strap from the second housing.

4. The busway splice connector of claim 1 further comprising a ground strap configured to be positioned across the second housing and defining an aperture configured to be aligned with the aperture of the first housing, the second housing and the insulator such that the fastener can extend through the aperture of the ground strap and resist separation of the ground strap from the aperture of the first housing, the second housing and the insulator.

5. The busway splice connector of claim 1 wherein:
    the insulator includes tongues extending outward therefrom towards the first housing and the second housing, and
    the first housing and the second housing each define grooves configured to receive the tongues of the insulator to resist separation of the insulator from the first housing and the second housing.

6. The busway splice connector of claim 1 wherein ends of the first housing are configured to contact an outer casing of adjacent busway sections to allow heat to dissipate from the first housing to the outer casing of each of the adjacent busway sections.

7. A busway coupler section usable as part of a busway splice connector or as part of a busway end feed coupler comprising:
    a connector defining a busbar volume for receiving a portion of at least one busbar of a busway section;
    a housing defining a window and a compartment for receiving the connector; and
    a cover configured to be coupled to the housing to restrict access to the window when the cover is coupled to the housing such that the busway coupler section is usable as part of the busway splice connector when the cover is coupled to the housing and usable as part of the busway end feed coupler when the cover is not coupled to the housing.

8. The busway coupler section of claim 7 further comprising a spacer configured to be positioned within the compartment along with the connector such that the spacer and the connector fit snugly within the compartment.

9. The busway coupler section of claim 7 wherein the connector includes a tab extending away from the connector and configured to extend through the window of the housing when the busway coupler section is assembled.

10. The busway coupler section of claim 9 further comprising an end feed coupler support coupled to the tab and configured to be positioned about the housing and to receive power from a power source such that the tab can receive the power from the power source via the end feed coupler support.

11. The busway coupler section of claim 10 wherein the end feed coupler support includes a casing configured to be positioned about the housing and a landing pad configured to be mechanically coupled to the casing and electrically coupled to the tab.

12. The busway coupler section of claim 10 further comprising an end feed plate defining an end feed window and configured to be coupled to the busway section and to the end feed coupler support such that the at least one busbar extends through the window and is received by the busbar volume of the connector when the busway coupler section is assembled.

13. The busway coupler section of claim 10 further comprising a box defining a volume for receiving the end feed coupler support such that the box can isolate the connector, the housing and the end feed coupler support when the busway coupler section is assembled.

14. The busway coupler section of claim 7 further comprising a second connector defining a second busbar volume for receiving a portion of at least a second busbar of the busway section and wherein the housing defines a second window and a second compartment for receiving the second connector and the cover is configured to restrict access to the second window when the cover is coupled to the housing.

15. The busway coupler section of claim 14 wherein the busway coupler section and a second busway coupler section can be combined to form at least one of the busway splice connector or the busway end feed coupler.

16. A busway splice connector comprising:
a first connector and a second connector each defining a busbar volume for receiving a portion of two busbars;
a first housing defining a first window and a first compartment for receiving the first connector;
a second housing defining a second window and a second compartment for receiving the second connector;
a first cover configured to be coupled to the first housing to restrict access to the first window; and
a second cover configured to be coupled to the second housing to restrict access to the second window such that the busway splice connector can be used as the busway splice connector when the first cover and the second cover are coupled to the first housing and the second housing and can be used as an end feed coupler without inclusion of the first cover and the second cover.

17. The busway splice connector of claim 16 further comprising an insulator configured to be positioned between the first housing and the second housing and to insulate the first connector from the second connector when the busway splice connector is assembled.

18. The busway splice connector of claim 17 wherein the first housing, the second housing and the insulator each define an aperture configured to be aligned when the busway splice connector is assembled and to receive a fastener for coupling the first housing, the second housing and the insulator to each other.

19. The busway splice connector of claim 17 wherein:
the insulator includes tongues extending outward therefrom towards the first housing and the second housing, and
the first housing and the second housing each define grooves configured to receive the tongues of the insulator to resist separation of the insulator from the first housing and the second housing.

* * * * *